United States Patent
Kim et al.

(10) Patent No.: US 12,543,749 B2
(45) Date of Patent: Feb. 10, 2026

(54) STARTER STRAIN AND SOURDOUGH USING THE SAME

(71) Applicant: LIVING JIN Co., Ltd., Seoul (KR)

(72) Inventors: Jin A Kim, Gyeonggi-do (KR); Sung Cheol Koh, Busan (KR); Yeon Ju Kim, Gyeonggi-do (KR)

(73) Assignee: LIVING JIN Co., Ltd., Seoul (KR)

( * ) Notice: Subject to any disclaimer, the term of this patent is extended or adjusted under 35 U.S.C. 154(b) by 249 days.

(21) Appl. No.: 18/500,391

(22) Filed: Nov. 2, 2023

(65) Prior Publication Data
US 2024/0148008 A1    May 9, 2024

(30) Foreign Application Priority Data

Nov. 8, 2022  (KR) .......................... 10-2022-0148242

(51) Int. Cl.
| | |
|---|---|
| *A21D 8/04* | (2006.01) |
| *C12N 1/18* | (2006.01) |
| *C12N 1/185* | (2026.01) |
| *C12N 1/20* | (2006.01) |
| *C12N 1/205* | (2026.01) |
| *C12R 1/01* | (2006.01) |
| *C12R 1/07* | (2006.01) |
| *C12R 1/865* | (2006.01) |

(52) U.S. Cl.
CPC ............. *A21D 8/045* (2013.01); *C12N 1/185* (2021.05); *C12N 1/205* (2021.05); *A23V 2400/321* (2023.08); *C12R 2001/01* (2021.05); *C12R 2001/07* (2021.05); *C12R 2001/865* (2021.05)

(58) Field of Classification Search
None
See application file for complete search history.

(56) References Cited

FOREIGN PATENT DOCUMENTS

| | | | | |
|---|---|---|---|---|
| EP | 3130662 B1 | * | 8/2019 | ............. A21D 13/00 |
| WO | WO-2015097216 A1 | * | 7/2015 | ............. A21D 8/045 |

* cited by examiner

*Primary Examiner* — Jyoti Chawla
(74) *Attorney, Agent, or Firm* — Dinsmore & Shohl LLP; Yongsok Choi, Esq.

(57) ABSTRACT

A starter for producing sourdough is provided. The starter includes *Saccharomyces cerevisiae* Y3-1 (KCTC 15070BP) and *Leuconostoc mesenteroides* M1-2 (KCTC 15071BP). The *Saccharomyces cerevisiae* Y3-1 (KCTC 15070BP), *Leuconostoc mesenteroides* M1-2 (KCTC 15071BP), and *Bacillus belezensis* Kh2-2 (KCTC 14642BP) are used in a weight ratio of 6 to 7:2 to 3:1 to 2.

5 Claims, 17 Drawing Sheets
Specification includes a Sequence Listing.

Showerdough starter comparison

*From the Left, Gompyo and Mcsun organic wheat flour (both are domestically milled), KingArthur and Bob's Red Mill (both are American product)

Sourdough bread (made in USA)

* Left (Bob's Red Mill), Right (KingArthur)

Sourdough bread (Korean flour milling)

* Left (Gompyo), Right (Mcsun organic)

STARTER STRAIN AND SOURDOUGH USING THE SAME

CROSS-REFERENCE TO RELATED APPLICATION

This application claims priority to Korean Patent Application No. 10-2022-0148242 filed on Nov. 8, 2022, the entire contents of which are herein incorporated by reference.

SEQUENCE LISTING

A computer-readable form (CRF) sequence listing having file name 146012-2_Sequence Listing.xml (8,708 Bytes), created on Nov. 24, 2025, is incorporated herein by reference. The nucleic and amino acid sequences listed in the accompanying sequence listing are shown using standard abbreviations as defined in 37 C.F.R. § 1.832.

TECHNICAL FIELD

The present disclosure relates to a new starter strain, *Saccharomyces cerevisiae* Y3-1 (KCTC 15070BP) and *Leuconostoc mesenteroides* M1-2 (KCTC 15071BP), and sourdough using the same.

BACKGROUND

Sourdough usually refers to dough made by cultivating *Lactobacillus* and yeast in wheat flour to create a sourdough starter, which is then inoculated into wheat flour dough and fermented. Sourdough is also called acid dough because it maintains acidity with organic acids produced during fermentation. A portion of the sourdough starter may be left over and used to make sourdough starter to be added to the next fermentation dough.

According to recent document, sourdough bakery products have been specialized in almost 50 countries and on all continents, mainly covering salty (bread and its substitutes) and sweet products (Arora et al., 2021). Italy has developed more than 30 traditional varieties of salty and sweet sourdough bakery products, and the unique composition and functional characteristics of sourdough used to make 19 typical breads and 18 sweet bakery products are known. In Asian countries, there are Iranian babari, Chinese steamed bread and Indian batu la sourdough bread, while in South America the main sourdough product is Mexican tortillas. Mass production of sourdough bread, rolls, crackers and cookies occurs in the United States.

Sourdough fermentation of legume flour increases the content of free amino acids (FAA), gamma-aminobutyric acid (GABA), polyphenols, dietary fiber (DF), and bioavailable minerals, promotes antioxidant activity and extracorporeal protein digestion, and lowers blood glucose levels.

Sourdough fermentation is utilized as a unique tool for improving the viscosity, texture, shelf life and nutritional properties of gluten-free formulations made from mixtures of rice, corn and similar cereal ingredients. Fermentation inhibits the lipase activity of the cereal germ, extending its shelf life and making it a nutrient-dense ingredient that can be used in bread-making recipes.

Because of its unique and complex microorganism, baking using sourdough has clear advantages over other leavening agents in terms of texture, rheology, shelf life, and several nutritional properties. Although the nutritional characteristics of sourdough need to be further discovered, it is necessary to improve its function by implementing research on the metabolic interaction (sourdough fermentome) between dominant *Lactobacillus*, yeast, and other surrounding microorganisms to reveal its action mechanism.

SUMMARY

One object of the present disclosure is to provide new strains, *Saccharomyces cerevisiae* Y3-1 (KCTC 15070BP) and *Leuconostoc mesenteroides* M1-2 (KCTC 15071BP), that may be used as sourdough starters.

Another object of the present disclosure is to provide a starter for producing sourdough including the new strain.

Yet another object of the present disclosure is to provide sourdough produced using the starter.

Still another object of the present disclosure is to provide bakery products including the sourdough.

According to one aspect of the present disclosure, there is provided a new yeast strain, *Saccharomyces cerevisiae* Y3-1 (KCTC 15070BP).

Further, there is provided a new *Lactobacillus* strain, *Leuconostoc mesenteroides* M1-2 (KCTC 15071BP).

According to another aspect of the present disclosure, there is provided a starter for producing sourdough including the new strains, *Saccharomyces cerevisiae* Y3-1 (KCTC 15070BP) and *Leuconostoc mesenteroides* M1-2 (KCTC 15071BP).

According to yet another aspect of the present disclosure, there is provided sourdough produced using the above-described starter.

According to still another aspect of the present disclosure, there is provided bakery products including the sourdough.

According to the present disclosure, bread produced from sourdough produced using a starter including the isolated strain of the present disclosure can relieve intestinal inflammation, suppress pathogens and harmful intestinal bacteria in feces, and increase beneficial bacteria, thereby inducing probiotic and postbiotic effects that can dramatically improve the intestinal environment.

DETAILED DESCRIPTION

Figure 1:
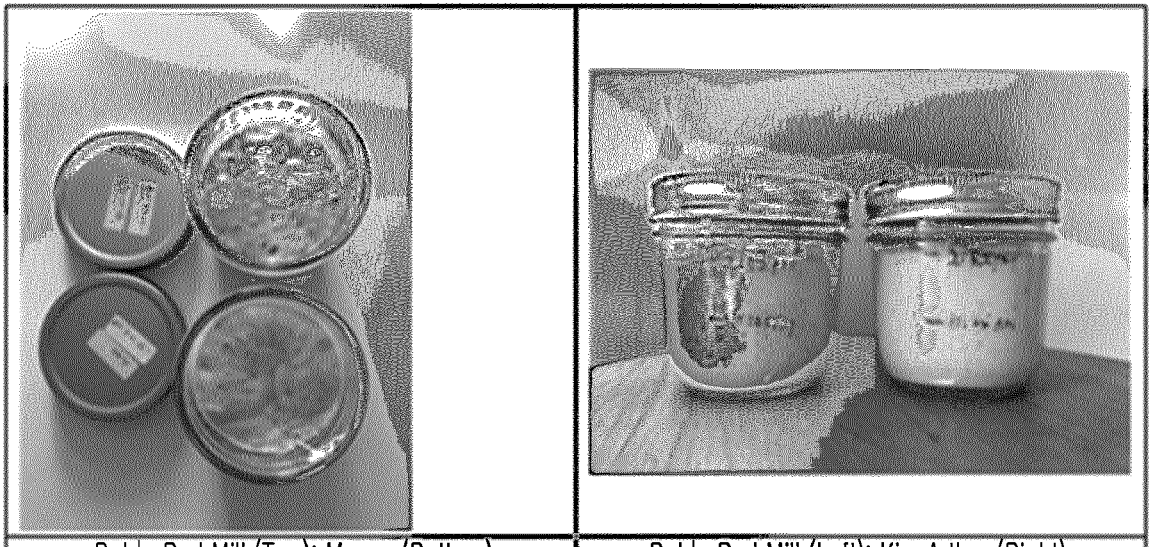
FIG. 1 is a photograph showing the results of a starter and baking test using a starter produced by using an isolated strain, according to one embodiment of the present disclosure.
Figure 1:
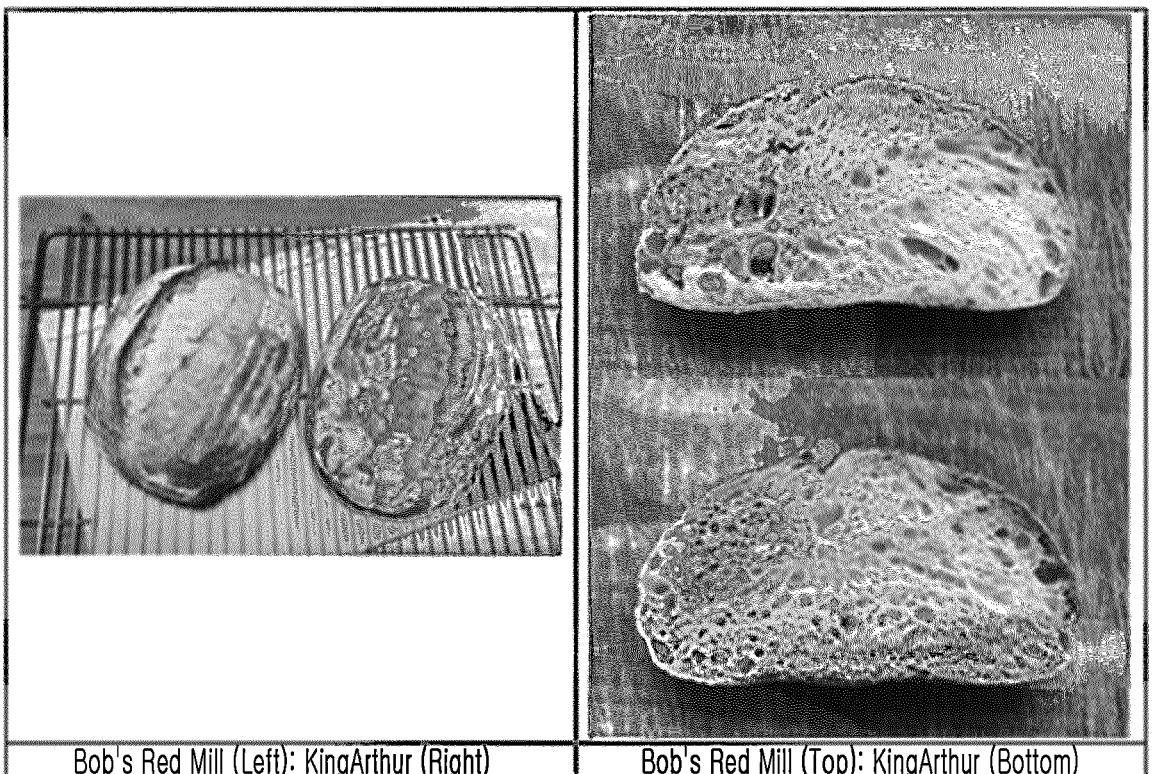

According to the present disclosure, there is provided a new strain that may be used for a sourdough starter. In the present disclosure, *Saccharomyces cerevisiae* Y3-1, isolated through the experiment described below, was deposited and given the deposit number 'KCTC 15070BP'. In addition, *Leuconostoc mesenteroides* M1-2 was deposited and given the deposit number 'KTCT 15071BP'.

The new strains, *Saccharomyces cerevisiae* Y3-1 (KCTC 15070BP) and *Leuconostoc mesenteroides* M1-2 (KTCT 15071BP) provided in the present disclosure have excellent fermentability and is suitable as a starter for sourdough, when used as a starter in the preparation of sourdough.

In particular, it is desirable to use *Saccharomyces cerevisiae* Y3-1 (KCTC 15070BP), *Leuconostoc mesenteroides* M1-2 (KTCT 15071BP), and *Bacillus belezensis* Kh2-2 (KCTC 14642BP) together as a starter for sourdough. The *Bacillus belezensis* Kh2-2 (KCTC 14642BP) is a strain isolated from salted squid as described in a document in the related art (Food Research International Volume 152, February 2022, 110911). It is preferable to use *Saccharomyces cerevisiae* Y3-1 (KCTC 15070BP), *Leuconostoc mesenteroides* M1-2 (KTCT 15071BP), and *Bacillus belezensis* Kh2-2 (KCTC14642BP) in a weight ratio of 6 to 7:2 to 3:1 to 2 in terms of sourdough fermentability, preference, and the effect of improving the intestinal function of bread produced using sourdough.

According to the present disclosure, there is provided sourdough produced using a starter including the above strain and a bakery product including the sourdough. The bakery product may be bread, biscuits, pies, crackers, or wafers, but is not limited thereto.

According to one embodiment of the present disclosure, when a feed produced from bread obtained by baking sourdough produced using a starter including the new strain of the present disclosure and *Bacillus valegansis* Kh2-2 is provided to an animal model of acute colitis caused by dextran sodium sulfate (DSS), disease activity index (DAI) was reduced, the increased IL-1 and TNF-α mRNA levels induced by DSS were significantly reduced, and inflammatory cytokines such as IL-1α, IL-6, and TNF-β were suppressed. Through these results, it was found that bread including sourdough produced using a starter including the new strain of the present disclosure has an intestinal improvement effect through alleviating intestinal inflammation, suppressing pathogens and harmful intestinal bacteria in feces, and increasing beneficial bacteria (see Experimental Example 2).

Preparation Example 1: Sourdough Preparation to Isolate Strains for Sourdough

Sourdough was produced using American organic wheat flour (Bob's Red Mill and KingArthur), and then microorganisms were isolated from a sourdough sample. The preparation method is as follows.

Day 1: 50 g of wheat flour and 50 g of warm water were mixed in a bottle container, and the bottle was capped.

Day 2: 50 g of the same wheat flour and 50 g of warm water were put and mixed in the bottle container, and then the bottle was capped.

Day 3: Bubbles start to appear on top. 50 g of wheat flour and 50 g of warm water were put and mixed in the bottle container, and then the bottle was capped.

Day 4: A few clear foams should be visible below the surface and may have a slightly fruity smell. 70 g of unprocessed bread crumbs, 30 g of rye flour, and 100 g of lukewarm water were mixed and feed, and the bottle was capped.

Day 5: The starter was newly cultured. 90% of the mixture was removed. The attached starter provides seeds for the next feeding. 70 g of unprocessed bread crumbs, 30 g of rye flour, and 100 g of lukewarm water were mixed and feed, and the bottle was capped.

Day 6: The amount of starter increases and there may be a layer of bubbles and foams. 70 g of unprocessed bread crumbs, 30 g of rye flour, and 100 g of lukewarm water were mixed and feed, and the bottle was capped.

Day 7: A 50/50 flour to water mix was maintained throughout the life of the starter. The starter activates for up to 6-12 hours while it increases in volume (more than doubles) and has a thick bubble layer on top and a rich foam network below the surface.

Example 1: Isolation and Identification of Microorganisms—*Leuconostoc mesenteroides* M1-2

As described above, a sourdough starter was produced using organic wheat flour made in USA and then isolated from this starter sample. The sample was smeared on an appropriately high MRS agar plates in phosphate buffer (pH 7.0), and then left and incubated at 37° C. for 24 to 48 hours. After dilution, pure isolated colonies were identified, streaked on separate MRS agar plates, and then isolated as pure strains. For long-term storage, it was suspended in 3000 glycerol and stored at $-80^{\prime\circ}$ C. Identification was performed by requesting CJ Bioscience Co., Ltd. (formerly Cheonlab) and implementing total 16S rRNA base sequencing. The identification results are shown in Table 1 below, and showed 9900 homology with *Leuconostoc mesenteroides*.

TABLE 1

```
Query = M1-2
        (1437 letters)
Database: 16salldb
        29,456 sequences; 39,657,981 total letters
Searching..............................................done    Score      E
Sequences producing significant alignments:                    (bits)     Value gi|631252714|ref|NR_113912.1|Leuconostoc mesenteroides strain N . . .   2611    0.0
gi|631252713|ref|NR_113911.1|Leuconostoc mesenteroides subsp. d . . .   2611    0.0
gi|444439642|ref|NR_074957.1|Leuconostoc mesenteroides strain A . . .   2611    0.0
gi|343200130|ref|NR_040817.1|Leuconostoc mesenteroides subsp. d . . .   2611    0.0
gi|631252056|ref|NR_113254.1|Leuconostoc mesenteroides subsp. d . . .   2611    0.0
gi|631252053|ref|NR_113251.1|Leuconostoc mesenteroides strain J . . .   2611    0.0
gi|1441204190|ref|NR_157602.1|Leuconostoc mesenteroides subsp . . ..    2603    0.0
gi|645321640|ref|NR_118557.1|Leuconostoc mesenteroides strain A . . .   2603    0.0
gi|343200131|ref|NR_040818.1|Leuconostoc mesenteroides subsp. c . . .   2603    0.0
gi|661903049|ref|NR_109003.1|Leuconostoc suionicum strain LMG 8 . . .   2595    0.0
gi|343200127|ref|NR_040814.1|Leuconostoc pseudomesenteroides st . . .   2571    0.0
gi|631250774|ref|NR_109004.1|Leuconostoc pseudomesenteroides KC . . .   2571    0.0
gi|1269801505|ref|NR_074997.2|Leuconostoc gelidum subsp. gasico . . .   2428    0.0
gi|959494902|ref|NR_133769.1|Leuconostoc gelidum subsp. aenigma . . .   2428    0.0
gi|265678474|ref|NR_028777.1|Leuconostoc gelidum subsp. gasicom . . .   2428    0.0
gi|1024974774|ref|NR_136799.1|Leuconostoc rapi strain LMG 27676 . . .   2420    0.0
gi|1269801500|ref|NR_075014.2|Leuconostoc kimchii strain IMSNU . . .    2407    0.0
gi|343200136|ref|NR_040823.1|Leuconostoc lactis strain KCTC 352 . . .   2405    0.0
```

TABLE 1-continued

```
gi|343202334|ref|NR_042620.1|Leuconostoc holzapfelii strain BFE ...    2405    0.0
gi|219857447|ref|NR_025035.1|Leuconostoc gelidum subsp. gelidum ...    2405    0.0
>gi|631252714|ref|NR_113912.1|Leuconostoc mesenteroides strain NBRC    100496 16S
ribosomal RNA, partial sequence Length = 1476
Score = 2611 bits (1317), Expect = 0.0 Identities = 1361/1373 (99%),
Gaps = 2/1373 (0%)
Strand = Plus/Plus
```

Query: SEQ ID NO: 1
Sbjct: SEQ ID NO: 2

```
Query:   32 gaaaggtgcttgcacctttca-gtgagtggcgaacgggtgagtaacacgtggacaacctg   90
             ||||||||||||||||||||| ||||||||||||||||||||||||||||||||||||||
Sbjct:   48 gaaaggtgcttgcacctttcaagtgagtggcgaacgggtgagtaacacgtggacaacctg  107

Query:   91 cctcaaggctggggataacatttggaaacagatgctaataccgaataaaacttagtgtcg  150
             ||||||||||||||||||||||||||||||||||||||||||||||||||||||||||||
Sbjct:  108 cctcaaggctggggataacatttggaaacagatgctaataccgaataaaacttagtgtcg  167

Query:  151 caggacacaaagttaaaaggcgcttcggcgtcacctagagatggatccgcggtgcattag  210
             ||  ||||||||||||||||||||||||||||||||||||||||||||||||||||||||
Sbjct:  168 catgacacaaagttaaaaggcgcttcggcgtcacctagagatggatccgcggtgcattag  227

Query:  211 ttagttggtggggtaaaggcctaccaagacaatgatgcatagcctaattgagagactgat  270
             |||||||||||||||||||||||||||||||||||||||||||| |||||||||||||||
Sbjct:  228 ttagttggtggggtaaaggcctaccaagacaatgatgcatagccgagttgagagactgat  287

Query:  271 cggccacattgggactgaaacacggcccaaactcctacgggaggctgcagtagggaatct  330
             |||||||||||||||||| |||||||||||||||||||| ||||||||||||||||||||
Sbjct:  288 cggccacattgggactgagacacggcccaaactcctacggagggctgcagtagggaatct  347

Query:  331 tccacaatgggcgaaagcctgatggagcaacgccacgtgtgtgatgaaggctttcgggtc  390
             ||||||||||||||||||||||||||||||||||| ||||||||||||||||||||||||
Sbjct:  348 tccacaatgggcgaaagcctgatggagcaacgccgcgtgtgtgatgaaggctttcgggtc  407

Query:  391 gtaaagcactgttggatgggaaaaacagctagaataggaaatgattttagtttgacggta  450
             ||||||||||||| |||||| |||||||||||||||||||||||||||||||||||||||
Sbjct:  408 gtaaagcactgttgtatgggaagaacagctagaataggaaatgattttagtttgacggta  467

Query:  451 ccataccagaaagggacggctaaatacgtgccagcagccgcggtaatacgtatgtcccga  510
             ||||||||||||||||||||||||||||||||||||||||||||||||||||||||||||
Sbjct:  468 ccataccagaaagggacggctaaatacgtgccagcagccgcggtaatacgtatgtcccga  527

Query:  511 gcgttatccggatttattgggcgtaaagcgagcgcagacggtttattaagtctgatgtga  570
             ||||||||||||||||||||||||||||||||||||||||||||||||||||||||||||
Sbjct:  528 gcgttatccggatttattgggcgtaaagcgagcgcagacggtttattaagtctgatgtga  587

Query:  571 aagcccggagctcaactccggaatggcattggaaactggttaacttgagtgcagtagagg  630
             ||||||||||||||||||||||||||||||||||||||||| ||||||||||||||||||
Sbjct:  588 aagcccggagctcaactccggaatggcattggaaactggttaacttgagtgcagtagagg  647

Query:  631 taagtggaactccatgtgtagcggtggaatgcgtagatatatggaagaacaccagtggcg  690
             ||||||||||||||||||||||||||||||||||||||||||||||||||||||||||||
Sbjct:  648 taagtggaactccatgtgtagcggtggaatgcgtagatatatggaagaacaccagtggcg  707

Query:  691 aaggcggcttactggactgcaactgacgttgaggctcgaaagtgtgggtagcaaacagga  750
             ||||||||||||||||||||||||||||||||||||||||||||||||||||||||||||
Sbjct:  708 aaggcggcttactggactgcaactgacgttgaggctcgaaagtgtgggtagcaaacagga  767

Query:  751 ttagataccctggtagtccacacegtaaacgatgaacactaggtgttaggaggtttccgc  810
             ||||||||||||||||||||||||||||||||||||||||||||||||||||||||||||
Sbjct:  768 ttagataccctggtagtccacaccgtaaacgatgaacactaggtgttaggaggtttccgc  827

Query:  811 ctcttagtgccgaagctaacgcattaagtgttccgcctggggagtacgaccgcaaggttg  870
             ||||||||||||||||||||||||||||||||||||||||||||||||||||||||||||
Sbjct:  828 ctcttagtgccgaagctaacgcattaagtgttccgcctggggagtacgaccgcaaggttg  887

Query:  871 aaactcaaaggaattgacggggacccgcacaagcggtggagcatgtggtttaattcgaag  930
             ||||||||||||||||||||||||||||||||||||||||||||||||||||||||||||
Sbjct:  888 aaactcaaaggaattgacggggacccgcacaagcggtggagcatgtggtttaattcgaag  947

Query:  931 caacgcgaagaaccttaccaggtcttgacatcctttgaagcttttagagatagaagtgtt  990
             ||||||||||||||||||||||||||||||||||||||||||||||||||||||||||||
Sbjct:  948 caacgcgaagaaccttaccaggtcttgacatcctttgaagcttttagagatagaagtgtt 1007

Query:  991 ctcttcggagacaaagtgacaggtggtgcatggtcgtcgtcagctcgtgtcgtgagatgt 1050
             ||||||||||||||||||||||||||||||||||||||||||||||||||||||||||||
Sbjct: 1008 ctcttcggagacaaagtgacaggtggtgcatggtcgtcgtcagctcgtgtcgtgagatgt 1067
```

TABLE 1-continued

```
Query: 1051 tgggttaagtcccgcaacgagcgcaacccttactgttagttgccagcattcagatgggca 1110
             ||||||||||||||||||||||||||||||| ||||||||||||||||||||||||||||
Sbjct: 1068 tgggttaagtcccgcaacgagcgcaacccttattgttagttgccagcattcagatgggca 1127

Query: 1111 ctctagcgagactgccggtgacaaaccggaggaaggcggggacgacgtcagatcatcatg 1170
             ||||||||||||||||||||||||||||||||||||||||||||||||||||||||||||
Sbjct: 1128 ctctagcgagactgccggtgacaaaccggaggaaggcggggacgacgtcagatcatcatg 1187

Query: 1171 cccttatgacctgggctacacacgtgctacaatggcgtatacaacgagttgccaacccg 1230
             ||||||||||||||||||||||||||||||||||||||||||||||||||||||||||||
Sbjct: 1188 cccttatgacctgggctacacacgtgctacaatggcgtatacaacgagttgccaacccg 1247

Query: 1231 cgagggtgagctaatctcttaaagtacgtctcagttcggattgtcgtctgcaactcgact 1290
             |||||||||||||||||||||||||||||||||||||||||||| |||||||||||||||
Sbjct: 1248 cgagggtgagctaatctcttaaagtacgtctcagttcggattgtagtctgcaactcgact 1307

Query: 1291 acatgaagttggaatcgctagtaatcgcggatcagcacgccgcggtgaatacgttcccgg 1350
             ||||||||| ||||||||||||||||||||||||||||||||||||||||||||||||||
Sbjct: 1308 acatgaagtcggaatcgctagtaatcgcggatcagcacgccgcggtgaatacgttcccgg 1367

Query: 1351 gtcttgtacacaccgcccgtcacaccatgggagtttg-aatgcccaaagccgg      1402
             |||||||||||||||||||||||||||||||||||| ||||||||||||||||
Sbjct: 1368 gtcttgtacacaccgcccgtcacaccatgggagtttgtaatgcccaaagccgg      1420
```

Example 2: Isolation and Identification of Microorganisms—*Saccharomyces cerevisiae* Y3-1

As described above, a sourdough starter was produced using organic wheat flour made in USA and then isolated from this starter sample. The sample was appropriately diluted in phosphate buffer (pH 7.0), smeared YPD agar plates, and then incubated at 37° C. for 24 to 48 hours. Thereafter, pure isolated colonies were identified, streaked on separate YPD agar plates, and then isolated as pure strains. For long-term storage, it was suspended in 3000 glycerol and stored at −80¹° C. Identification was performed by requesting CJ Bioscience Co., Ltd. (formerly Cheonlab) and implementing base sequencing of the 18SrRNA ITS (internal transcribed spacer) 1 and 4 regions. The identification results are shown in Table 2 below, and showed 960% homology with the *Saccharomyces cerevisiae* CBS 1171 ITS region.

TABLE 2

```
Query = Y3-1
        (818 letters)
Database: 16Salldb.fna
          43,045 sequences; 50,890,384 total letters
Searching................................................done      Score      E
Sequences producing significant alignments:                        (bits)    Value NR_111007.1 Saccharomyces cerevisiae CBS 1171 ITS region; from T . . .   1205   0.0
NR_144772.1 Saccharomyces cariocanus NRRL 27337 ITS region; from . . .   1195   0.0
NR_138272.1 Saccharomyces paradoxus CBS 432 ITS region; from TYP . . .   1191   0.0
NR_111354.1 Saccharomyces mikatae ATCC MYA-4448 ITS region; from . . .   1138   0.0
NR_111355.1 Saccharomyces kudriavzevii ATCC MYA-                         1118   0.0
4449 ITS region; . . .
NR_153296.1 Saccharomyces arboricola CBS 10644 ITS region; from . . .    1080   0.0
NR_138273.1 Saccharomyces pastorianus NRRL Y-27171 ITS region; f . . .   1068   0.0
NR_153310.1 Saccharomyces uvarum CBS 395 ITS region; from TYPE m . . .   1068   0.0
NR_138274.1 Saccharomyces bayanus NRRL Y-12624 ITS region; from . . .    1068   0.0
NR_137586.1 Saccharomyces eubayanus PYCC 6148 ITS region; from T . . .   1027   0.0
NR_163532.1 Kazachstania zonata CBS 10326 ITS region; from TYPE . . .     293   1e-78
NR_111088.1 Naumovozyma dairenensis CBS 421 ITS region; from TYP . . .    281   5e-75
NR_111124.1 Vanderwaltozyma polyspora NRRL Y-8283 ITS region; fr . . .    281   5e-75
NR_136949.1 Torulaspora maleeae NBRC 11061 ITS region; from TYPE . . .    280   2e-74
NR_138217.1 Torulaspora franciscae NRRL Y-6686 ITS region; from . . .     280   2e-74
NR_138199.1 Torulaspora microellipsoides NRRL Y-1549 ITS region; . . .    280   2e-74
NR_137029.1 Torulaspora quercuum CGMCC AS 2.3768 ITS region; fro . . .    278   8e-74
NR_138187.1 Kazachstania unispora CBS 398 ITS region; from TYPE . . .     278   8e-74
```

TABLE 2-continued

```
NR_111006.1 Kazachstania martiniae CBS 6334 ITS region; from TYP . . .    278    8e-74
NR_138201.1 Zygosaccharomyces bailii NRRL Y-2227 ITS region; fro . . .    276    3e-73
>NR_111007.1 Saccharomyces cerevisiae CBS 1171 ITS region; from TYPE
material Length = 752
Score = 1205 bis (608), Expect = 0.0
Identities = 699/723 (96%), Gaps = 6/723 (0%)
Strand = Plus/Plus
```

Query: SEQ ID NO: 3
Sbjct: SEQ ID NO: 4

```
Query:  68  tttttttgttttggcaagagcatgagagcttttactgggcaagaagacaagagatggaga  127
            ||||||||||||||||||||||||||||||||||||||||||||||||||||||||||||
Sbjct:  29  tttttttgttttggcaagagcatgagagcttttactgggcaagaagacaagagatggaga   88

Query: 128  gtccagccgggcctgcgcttaagtgcgcggtcttgctaggcttgtaagtttctttcttgc  187
            ||||||||||||||||||||||||||||||||||||||||||||||||||||||||||||
Sbjct:  89  gtccagccgggcctgcgcttaagtgcgcggtcttgctaggcttgtaagtttctttcttgc  148

Query: 188  tattccaaacggtgagagattttgtgcttttgttataggacaattaaaaccgtttcaat  247
            |||||||||||||||||||||| |||||||||||||||||||||||||||||||||||||
Sbjct: 149  tattccaaacggtgagagatttctgtgcttttgttataggacaattaaaaccgtttcaat  208

Query: 248  acaacacactgtggagttttcatatctttgcaacttttctttgggcattcgagcaatcg  307
            ||||||||||||||||||||||||||||||||||||||||||||||||||||||||||||
Sbjct: 209  acaacacactgtggagttttcatatctttgcaacttttctttgggcattcgagcaatcg  268

Query: 308  gggcccagaggttaacaaacccaaacaattttatttattcattaaattttgtcaaaaac  367
            |||||||||||| ||||||||| |||||||||||| ||| ||||||||||||||||||||
Sbjct: 269  gggcccagagg-taacaaacacaaacaattttatctattcattaaattttgtcaaaaac  327

Query: 368  aagaattttgtaactggaaatttt-aaaatattaaaaactttcaacaacggattttttg  426
            |||||||| |||||||||||||||| |||||||||||||||||||||||||||| | |||
Sbjct: 328  aagaattttcgtaactggaaattttaaaaatattaaaaactttcaacaacggatctcttg  387

Query: 427  gttttcgcatcgatgaagaacgcagcgaaatgcaaaacgtaatgtgaattgcagaattcc  486
            ||| ||||||||||||||||||||||||||||| |||||||||||||||||||||||||
Sbjct: 388  gttctcgcatcgatgaagaacgcagcgaaatgcgatacgtaatgtgaattgcagaattcc  447

Query: 487  gggaatcatcgaattttttgaacgcccattgcgccccttggtattccggggggcatgcctg  546
            | |||||||||||| |||||||||| ||||| ||||||||||||||||||| ||||||||
Sbjct: 448  gtgaatcatcgaatctttgaacgcacattgc-ccccttggtattccaggggcatgcctg  506

Query: 547  tttgagggtcatttccttttcaaacattttgtttggtagggagggatactctttggagtt  606
            |||||| |||||||||||| |||||||| |||||||||| |||| |||||||||||||||
Sbjct: 507  tttgagcgtcatttccttctcaaacattctgtttggtagtgagtgatactctttggagtt  566

Query: 607  aacttgaaattgctggccttttcattggatgttttttttttccaaagagaggtttctctg  666
            ||||||||||||||||||||||||||||||| |||||||||||||||||||||||||||
Sbjct: 567  aacttgaaattgctggccttttcattggatg--ttttttttccaaagagaggtttctctg  624

Query: 667  cgtgcttgaggtataatgcaagtacggtcgtttaggttttaccaactgcggctaatctt  726
            ||||||||||||||||||||||||||||||||||||||||||||||||||||||||||||
Sbjct: 625  cgtgcttgaggtataatgcaagtacggtcgtttaggttttaccaactgcggctaatctt  684

Query: 727  ttttatactgagcgtattggaacgttatcgataagaagagagcgtctaggcgaacaatgt  786
            |||||||||||||||||||||||||||||||||||||||||||||||||||| |||||||
Sbjct: 685  ttttatactgagcgtattggaacgttatcgataagaagagagcgtctaggc-aacaatgt  743

Query: 787  tct  789
            |||
Sbjct: 744  tct  746
```

Example 3: Preparation and Baking Tests of Sourdough Starter Using Mixed Strains 3-1. Sourdough Starter Culture and Baking Testing As shown in Table 3 below, eight tests were set up and 5 starter culture tests were performed.

TABLE 3

| Test port number | Starter strain used | Wheat flour | Remarks |
| --- | --- | --- | --- |
| 1 | Natural fermentation species | KingArthur (made in USA) | Self-owned natural fermentation species + corresponding wheat flour feeding |
| 2 | | Bob's Red Mill (made in USA) | |
| 3 | | Gompyo wheat flour (made in Korea) | |
| 4 | | Mcsun (made in Korea) | |
| 5 | * *Saccharomyces cerevisiae* Y3-1 (KCTC 15070BP) (yeast) *Leuconostoc mezenteroid* M1-2 (KTCT 15071BP) (*Lactobacillus*) *Bacillus belezensis* Kh2-2 (KCTC14642BP) | KingArthur (made in USA) | Yeast: *Lactobacillus*: *Bacillus* = used in a weight ratio of 7:2;1 |
| 6 | | Bob's Red Mill (made in USA) | |
| 7 | | Gompyo wheat flour (made in Korea) | |
| 8 | | Mcsun (made in Korea) | |

* Strains are in powder form (including dextrin)

The characteristics of the flour for testing are shown in Table 4 below.

TABLE 4

| Items | Made in USA (milled locally in USA) | | Domestic (imported wheat, domestic flour milling) | |
| --- | --- | --- | --- | --- |
| Product name | Bob's Red Mill | KingArthur | Gompyo | Mcsun |
| Organic or not | o | o | x | o |
| Classification by use | Medium flour | Medium flour | Strong flour | Strong flour |
| Particle brightness (relative) | Slightly dark | Slightly dark | Bright | Slightly bright |
| Bleached or not | x | x | x | x |
| Country of origin | USA | USA | Canada, USA | Canada, Turkey |
| Includes other materials | x | Organic barley flour | x | x |
| Gluten strength (relative) | Bob's Red Mill < KingArthur | | Gompyo ≥ Mcsun | |

<Second Round of Starter Using Wheat Flour from USA—Test Ports 5 and 6 in Table 3>

The culture conditions for the strain used as a starter strain are as follows. For culturing yeast and *Lactobacillus*, a medium (250 L medium was used in a 500 L fermenter) including glucose 10 (g/L), polypeptone 20, yeast extract 20, $NH_4NO_3$ 2, and potassium phosphate (dibasic; $K_2T$-$IPO_4$) 2 was used, and the yeast culture conditions were 28° C. for 2 days, and the culture conditions for *Lactobacillus* were 30° C. for 1.5 days. After culturing, 1 kg each of maltodextrin and trehalose were input as cryoprotectants to the culture fluid, and then freeze-dried. In addition, the culture of the *Bacillus* strain used a medium (60 L medium was used in a 100 L fermenter) including tryptone (g/L) 17, soytone 3, glucose 2.5, NaCl 0.5, and dipotassium phosphate 1, and the culture conditions were 30° C. for 2 days, after culturing, 6 kg dextran (1000 weight ratio) was added to the culture fluid as a cryoprotectant and then freeze-dried. The starter strains were produced in a ratio (weight ratio) of yeast:*Lactobacillus*:*Bacillus*=7:2:1, and were diluted 50-100 times in maltodextrin. The starter was made at a ratio of water:wheat flour=50 g: 50 g, and the starter strains were added at a weight ratio of 1%. Preparation of the starter took about 10-12 hours at room temperature (24-25° C.). In the case of Bob's Red Mill, the initial pH was 6.1 and at the end of fermentation it was 5.4, and in the case of KingArthur, the initial pH was 6.1 and at the end of fermentation it was 5.4.

<Second Sourdough Preparation and Baking Test Using Wheat Flour from USA>

A baking test was performed using the second normal fermentation starter from USA as shown in Table 8 below, the first fermentation took 4 hours, and the second fermentation took 1 hour 45 minutes and 2 hours 47 minutes, respectively.

TABLE 5

| Fermentation process | Bob's Red Mill | KingArthur |
| --- | --- | --- |
| Starting Autolyse | 7:53 AM | 8:58 AM |
| First fermentation started | 8:25 AM pH 6.24 23.4° C. | 9:28 AM pH 6.09 24.3° C. |
| First fermentation completed | 12:25 PM pH 5.59 25.2° C. | 1:28 PM pH 5.45 24.7° C. |
| Second fermentation started | 12:35 PM 25.2° C. | 1:41 PM 24.5° C. |

TABLE 5-continued

| Fermentation process | Bob's Red Mill | KingArthur |
| --- | --- | --- |
| Second fermentation completed | 2:20 PM 24.4° C. | 4:28 PM 24.1° C. |
| Baking | Starts at 2:25 PM Completed at 2:52 PM | Starts at 4:30 PM Completed at 5:03 PM |

The fermentation and baking of the starter are shown in FIG. 1.

<First Round of Starter Using Domestic Wheat Flour—Test Ports 7 and 8 in Table 3>

The starter strains were produced in a ratio (weight ratio) of yeast:*Lactobacillus*:*Bacillus*=7:2:1, and were diluted 50-100 times in maltodextrin. The starter was made at a ratio of water:wheat flour=50 g: 50 g, and the starter strains were added at a weight ratio of 1%. Preparation of the starter took about 10-12 hours at room temperature (23-25° C.). In the case of Gompyo strong flour, the initial pH was 6.05 and at the end of fermentation, it was 5.36, and in the case of strong flour from Mcsun, the initial pH was 6.12 and at the end of fermentation it was 5.50.

<First Sourdough Preparation and Baking Test Using Domestic Wheat Flour>

A baking test was performed as shown in Table 6 below using a starter (first starter using domestic wheat flour) that was normally fermented using the domestic wheat flour. The first fermentation took 4 hours 19 minutes/3 hours 53 minutes respectively, and the second fermentation took 2 hours 35 minutes/1 hour 13 minutes respectively.

TABLE 6

| Fermentation process | Gompyo strong flour | Mcsun strong flour |
| --- | --- | --- |
| Start Autolyse | 8:51 AM | 9:32 AM |
| | * Check Gompyo first during every pH test | |
| First fermentation started | 9:21 AM pH 6.31 24.0° C. | 10:02 AM pH 6.21 24.1° C. |
| First fermentation completed | 1:40 PM pH 5.90 24.6° C. | 1:55 PM pH 5.69 24.6° C. |
| Second fermentation started | 1:57 PM 24.5° C. | 2:07 PM 24.5° C. |
| Second fermentation completed | 4:32 PM 24.5° C. | 3:20 PM 24.2° C. |
| Baking | Starts at 4:34 PM Completed at 5:05 PM | Starts at 3:22 PM Completed at 3:54 PM |

Figure 2:
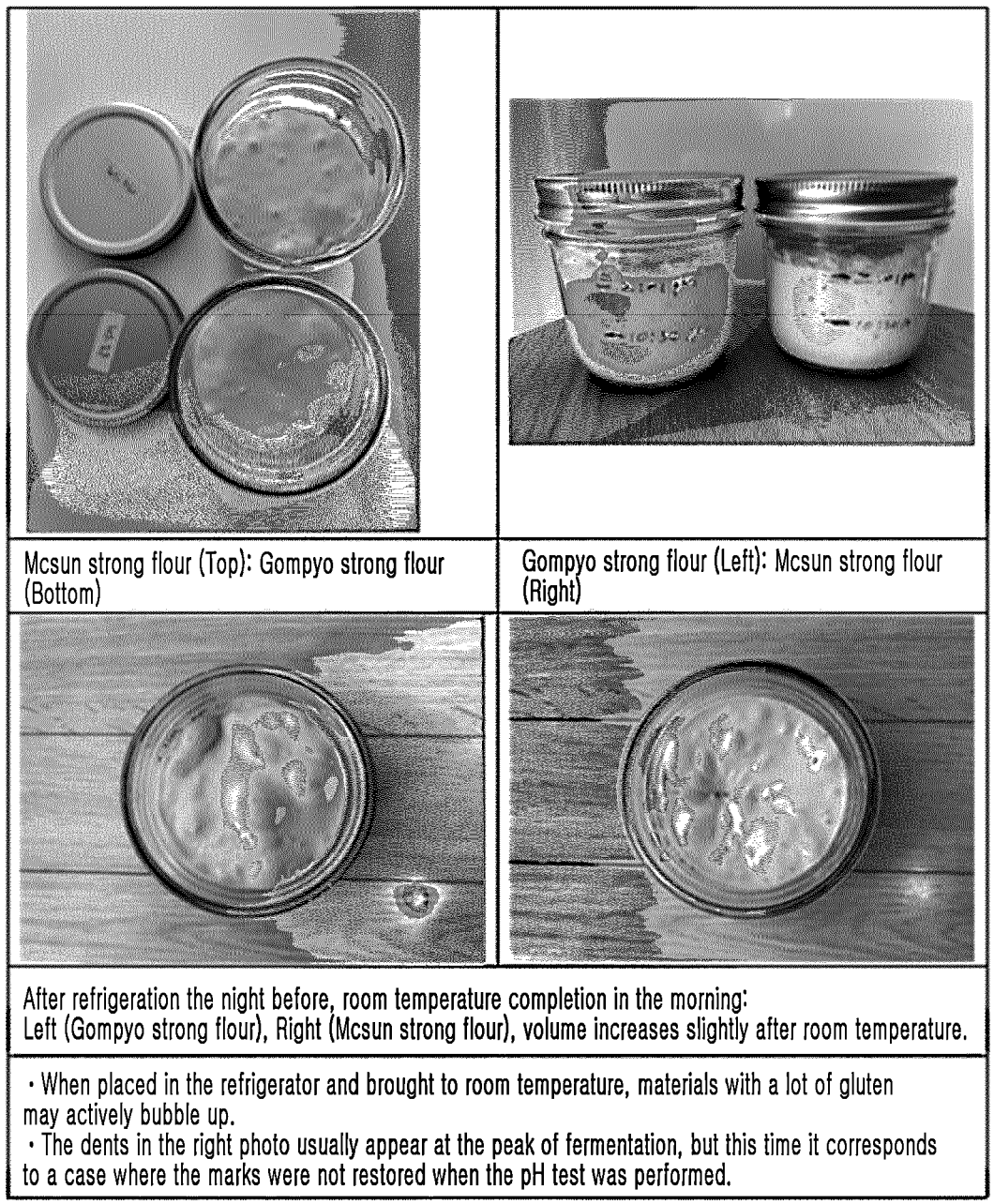
FIG. 2 is a photograph showing the results of a starter and baking test using a starter produced by using an isolated strain, according to one embodiment of the present disclosure.
Figure 3:
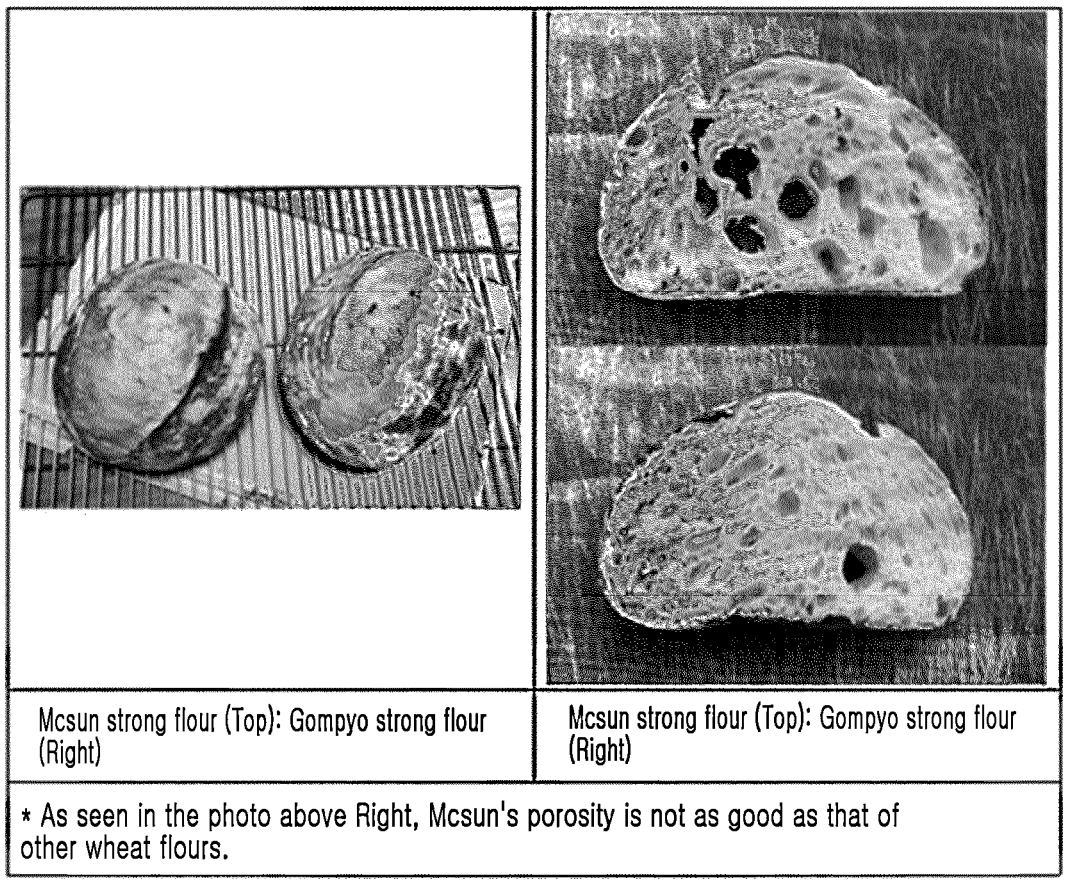
FIG. 3 is a photograph showing the results of a starter and baking test using a starter produced by using an isolated strain, according to one embodiment of the present disclosure.

The fermentation and baking of the starter are shown in FIGS. 2 and 3.

3-2. Flavor and Texture Evaluation of Bread Tested and Produced with Isolated Strain Starters The results of the flavor and texture evaluation of bread produced with the isolated strain starter performed in 3-1 are shown in Tables 7 and 8 below.

TABLE 7

| Evaluation items | Normal fermentation starter 1st/2nd test Made in USA (milled locally in USA) | | Normal fermentation starter 1st/2nd test Made in Korea (imported wheat, domestic flour milling) | |
| --- | --- | --- | --- | --- |
| | Bob's Red Mill | KingArthur | Gompyo | Mcsun |
| Crust | There were samples that were baked a little longer depending on the circumstances, such as adjusting the heat, but there was no significant difference and the taste was still delicate and sweet. | | | |
| Acidity | There were subtle differences in pH values, but they were very, very mild. | | | |

TABLE 7-continued

| Evaluation items | Normal fermentation starter 1st/2nd test Made in USA (milled locally in USA) | | Normal fermentation starter 1st/2nd test Made in Korea (imported wheat, domestic flour milling) | |
|---|---|---|---|---|
| | Bob's Red Mill | KingArthur | Gompyo | Mcsun |
| Crumb | Bland taste | | Bland taste Feels blander than the USA product In particular, the savory taste of Mcsun is lacking. | |
| Texture | When tasted on the same day after baking and cooling, the texture is generally tough. When tasting after two days, the texture is generally much softer. | | | |
| | From the time of kneading KingArthur Seems to have stronger gluten than Bob's Red Mill | | Domestic mill products appear to have strong gluten from the time they are kneaded. | |

TABLE 8

| Evaluation items | Integration |
|---|---|
| Color | Bob's Red Mill > KingArthur > Mcsun |
| Flavor | Macsun > KingArthur > Bob's Red Mill |
| Taste | Bob's Red Mill > KingArthur > Mcsun |
| External shape | KingArthur > Bob's Red Mill > Mcsun |
| Texture | Bob's Red Mill > Mcsun > KingArthur |
| Overall preference | Bob's Red Mill > KingArthur > Mcsun |

There was almost no acidity in the Korean product (Macsun), but acidity was felt in the USA product (Bob's Red Mill, KingArthur). There was a slight scent of fermented soybean paste, and Bob's Red Mill was evaluated as having good taste and texture (chewy, moderate acidity, and delicious bread crust). When eaten after some time (20 to 30 minutes), the acidity felt stronger, and there was an astringent feeling and a slightly numb tongue.

3-3. Preparation and Evaluation of Sourdough Bread Using Natural Yeast Starter

The sourdough starter fermentation conditions are shown in Table 9 below and were applied equally regardless of the type of wheat flour.

TABLE 9

| | |
|---|---|
| Starter ratio (Old fermented species:water:wheat flour) | 1:5.6:5.6 (10 g:56 g:56 g) |
| Fermentation time | 11 hours (Estimated 8 hours at 24° C.) |
| Fermentation temperature | 22.8° C. |

The dough fermentation conditions are shown in Table 10 below.

TABLE 10

| Fermentation process | | Made in USA (milled locally in USA) | | Made in Korea (imported wheat, domestic flour milling) | |
|---|---|---|---|---|---|
| | | Bob's Red Mill | KingArthur | Gompyo | Mcsun |
| First fermentation (room temperature) | Time | 4 hours 42 minutes | 4 hours 19 minutes | 4 hours 47 minutes | 4 hours 36 minutes |
| | Fermentation temperature | 23.2-24.1° C. | | 23.2-24.0° C. | |
| Second fermentation * (Room temperature + low temperature) | Time | 4 hours 43 minutes | 4 hours 30 minutes | 5 hours | 3 hours 15 minutes |
| | Fermentation temperature | 24.0° C. (9° C. at low temperature) | | 24.2-24.0° C. (9° C. at low temperature) | |

Due to the baking schedule, it was refrigerated and low-temperature fermented for a short period of time (fermented at room temperature for 1 hour each, then refrigerated and low-temperature fermented, and then fermented again at room temperature). Because Bob's Red Mill and Gompyo were left in the refrigerator for about 35 minutes longer, the time it took for them to come to room temperature also took longer. Although it is called low-temperature fermentation, it is not left long enough to enhance the flavor, and 100% white wheat does not require long-term low-temperature fermentation.

The pH of the sourdough starter is shown in Table 11 below.

TABLE 11

| Measuring items | Made in USA (milled locally in USA) | | Made in Korea (imported wheat, domestic flour milling) | |
|---|---|---|---|---|
| | Bob's Red Mill | KingArthur | Gompyo | Mcsun |
| pH | 4.90 | 4.92 | 4.84 | 4.87 |

The pH change during baking is shown in Table 12 below.

TABLE 12

| | | Made in USA (milled locally in USA) | | Made in Korea (imported wheat, domestic flour milling) | |
|---|---|---|---|---|---|
| Fermentation process | | Bob's Red Mill | KingArthur | Gompyo* | Mcsun |
| First fermentation pH | Fermentation beginning | 5.81 | 5.79 | 5.87 | 5.89 |
| | Fermentation completion | 5.37 | 5.50 | 5.36 | 5.66 |

Figure 4:
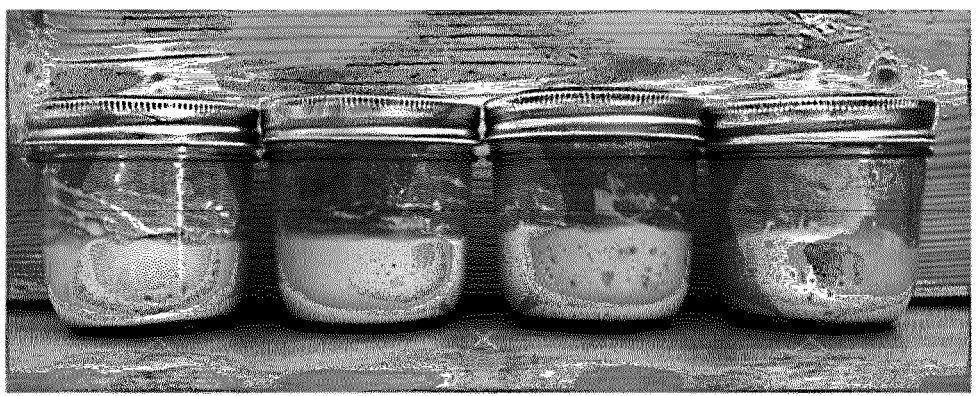
FIG. 4 is a photograph showing the test results of a starter produced by using the applicant's own natural yeast, according to one embodiment of the present disclosure.
Figure 5:
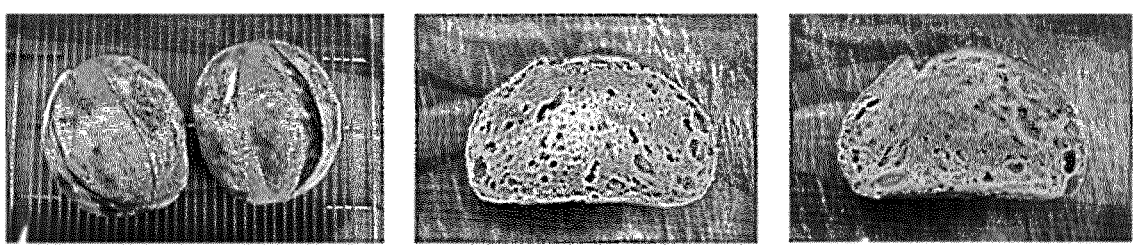
FIG. 5 is a photograph showing the results of a baking test using a starter produced by using the applicant's own natural yeast, according to one embodiment of the present disclosure.
Figure 5:
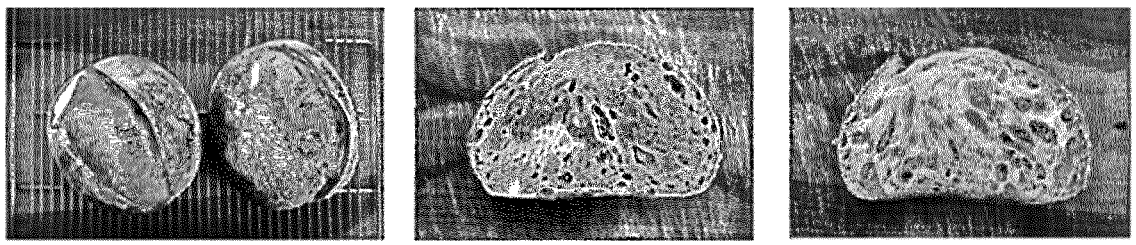
Figure 6:
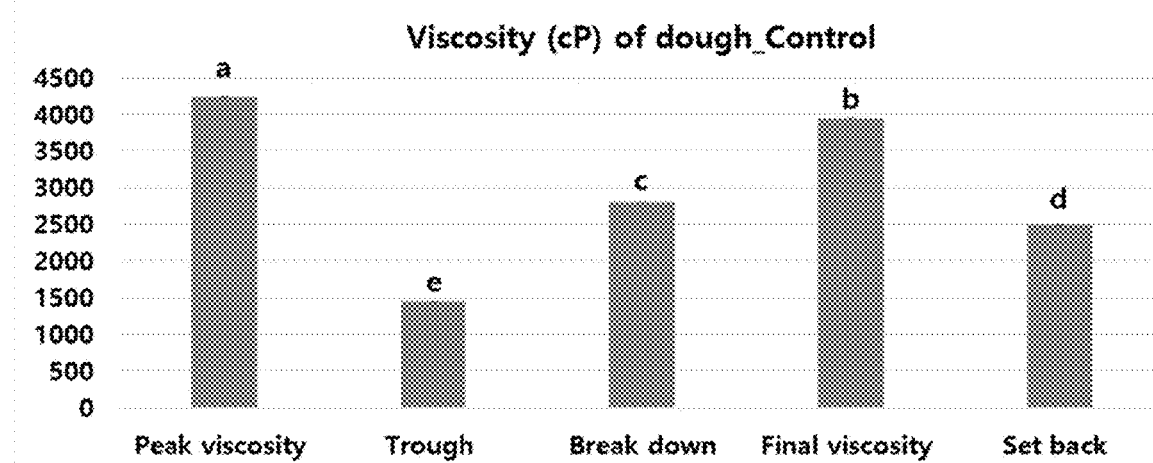
FIG. 6 is a graph showing the results of viscosity analysis for the dough of wheat flour (Bob's Red Mill, made in USA) without treatment of starter produced using the isolated strain according to the present disclosure, in Experimental Example 1 of the present disclosure.
Figure 7:
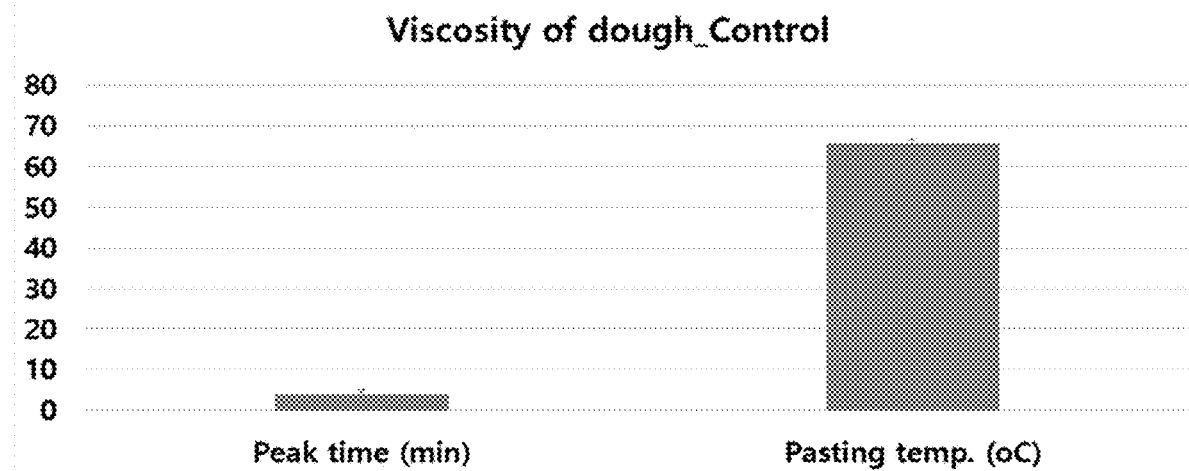
FIG. 7 is a graph showing the results of viscosity analysis for the dough of wheat flour (Bob's Red Mill, made in USA) without treatment of starter produced using the isolated strain according to the present disclosure, in Experimental Example 1 of the present disclosure.
Figure 8:
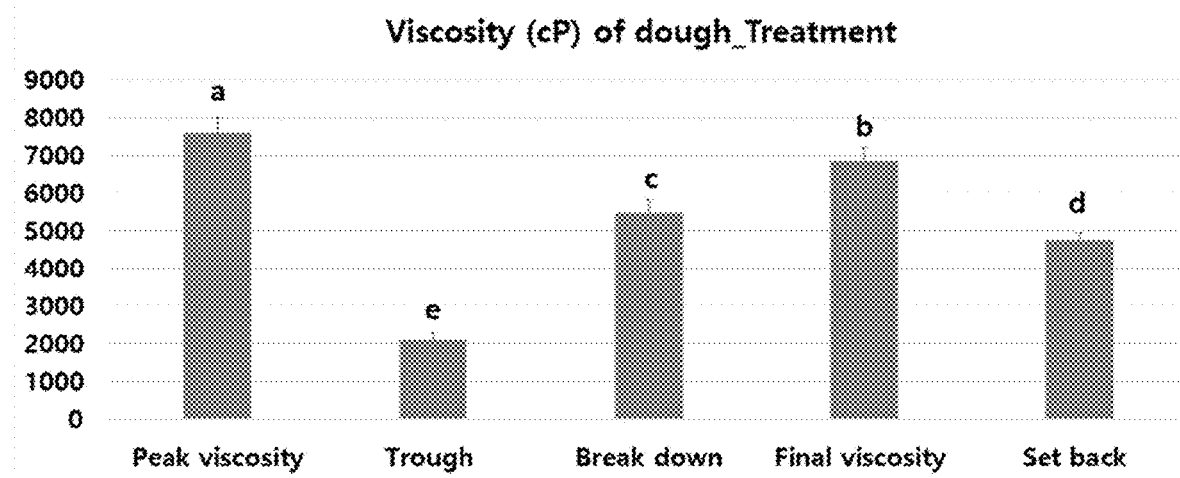
FIG. 8 is a graph showing the results of viscosity analysis for the dough of wheat flour (Bob's Red Mill, made in USA) treated with starter produced using the isolated strain according to the present disclosure, in Experimental Example 1 of the present disclosure.
Figure 9:
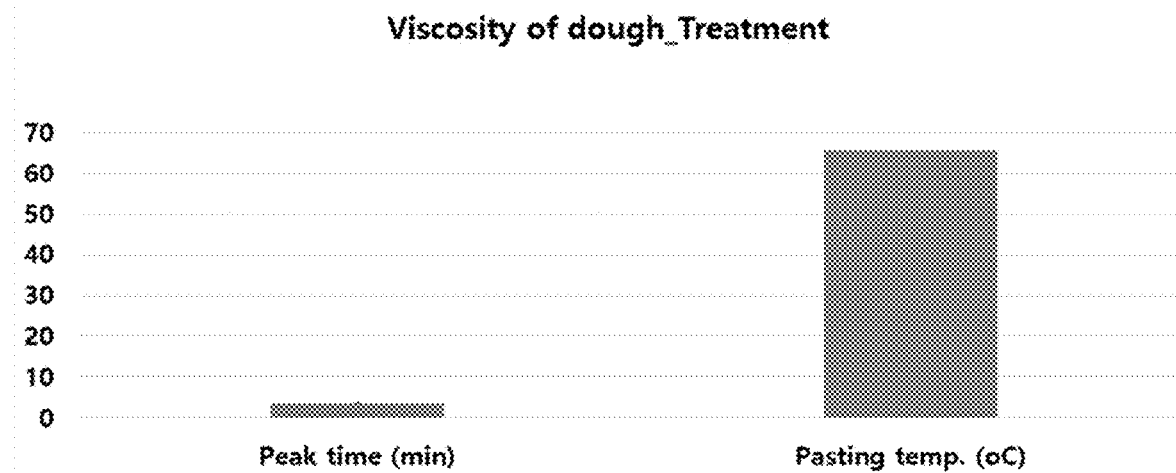
FIG. 9 is a graph showing the results of viscosity analysis of the dough of wheat flour (Bob's Red Mill, made in USA) treated with starter produced using the isolated strain according to the present disclosure in Experimental Example 1 of the present disclosure.

The sourdough starter and the produced bread are shown in FIGS. 4 and 5.

The sensory evaluation results of the sourdough bread are shown in Table 13 below.

TABLE 13

| Evaluation items | Made in USA (milled locally in USA) | | Made in Korea (imported wheat, domestic flour milling) | |
|---|---|---|---|---|
| | Bob's Red Mill | KingArthur | Gompyo | Mcsun |
| Crust flavor | Taste is stronger than Korean flour milling | | More nutty and less sweet than USA products | |
| Crumb | Rough texture | Savory taste | Bland taste | More savory taste than Gompyo |
| Pore | Irregularly sized pores spread out Good fermentation condition | | Irregularly sized pores spread out Good fermentation condition | Pores are somewhat large |
| Acidity | Acidity is more pronounced than that of bread for strain testing. | | | |
| Gluten strength | Based on tasting on the first day, softer texture than bread for strain testing | | | |

Experimental Example 1: Viscosity Test of Wheat Flour (Bob's Red Mill) Dough

Sample processing conditions
Untreated group: 5 g wheat flour (Bob's Red Mill)+22 g water
Treated group: 5 g wheat flour (Bob's Red Mill)+20 g water+2 g starter strains As in the case above, in the starter strains, *Saccharomyces cerevisiae* Y3-1 (KCTC 15070B3P), *Leuconostoc mezenteroid* M1-2 (KTCT 15071B3P), and *Bacillus belezensis* Kh2-2 (KCTC14642BP) were used as yeast, *Lactobacillus*, and *Bacillus* bacteria, respectively, and tests were performed based on the strain ratio (yeast: *Lactobacillus*: *Bacillus*=7:2:1 weight ratio).

Analysis instrument: Rapid viscosity meter (RVA: N103802, Perten, Pty.) (from Australia)

Instrument operating conditions: See Table 14 (viscosity test conditions for dough of representative wheat flour (Bob's Red Mill, USA) used in sourdough)

TABLE 14

| Time (hh:mm:ss) | Function type | Value |
|---|---|---|
| 00:00:00 | Temperature | 50° C. |
| 00:00:00 | Speed | 960 rpm |
| 00:00:10 | Speed | 160 rpm |
| 00:04:00 | Temperature | 95° C. |
| 00:06:00 | Temperature | 95° C. |
| 00:10:00 | Temperature | 50° C. |
| 00:12:00 | Temperature | 50° C. |
| 00:13:00 | End | |

First, the results of viscosity analysis of Bob's Red Mill wheat flour with and without treatment of the isolated strain starter are shown in FIGS. 6 to 9. Referring to FIGS. 6 to 9, in the processed case, almost all viscosity analysis steps except peak time [peak viscosity (cP), trough (cP), break down (cP), final viscosity (cP), and set back (cP)] showed an viscosity increase of 78.5, 44.2, 96.2, 73.8, and 90.9%, respectively. The reason for the viscosity increase is not clear, but it is believed that the cause is a temporary increase in the viscosity of the gluten component of the wheat flour due to the action of added microorganisms (yeast, *Lactobacillus*, and *Bacillus* bacteria) for a short period of time (13 minutes).

Experimental Example 2: Review of Intestinal Improvement Effects Through Analysis of Changes in Alleviating Inflammation, Strengthening Immunity, Suppressing Pathogens and Harmful Intestinal Bacteria in Feces, and Increasing Beneficial Bacteria 2-1. Preparation of Feed for Mouse Experiments Before preparing the test feed, sourdough bread and yeast bread of the isolated strains were first produced according to the method below. The main materials used in the production of sourdough starter and bread was white refined wheat flour (USA produce: Bob's Red Mill and KingArthur; Korean product: Gompyo and Mcsun). The mixed ingredients of the starter consisted of water (40 ml), wheat flour (40 g), and starter (2 g), and as new strain starters, *Saccharomyces cerevisiae* Y3-1 (KCTC 15070BP), *Leuconostoc mesenteroide* M1-2 (KTCT 15071BP) and *Bacillus velegensis* Kh2-2 (KCTC14642BP) were produced in a weight ratio of 7:2:1. In addition, in the case of natural yeast sourdough, the research team's own natural fermentation strain was used as a starter strain. The mixture of ingredients was incubated at 24-25° C. for approximately 10 hours. The sourdough was then prepared using starter (80 g), wheat flour (230 g), whole wheat flour (10 g) and water (160 ml or more). Thereafter, the sourdough was autolyzed for 30 minutes at 24-25° C. After autolysis, salt (4 g) was added to the sourdough and first fermentation was performed at 24-25° C. for 4 hours. Stretch and fold were performed once at 15-30 minute intervals during fermentation. After molding, second fermentation was performed at 24 to 25° C. for about 1.5 hours and scoring was made. The oven was preheated to 250° C. for 30 minutes, the sourdough was baked at 250° C. for 8 to 10 minutes with hot steam, the steam was removed, the temperature was lowered to 220° C. until the crust turns black, and was baked for 20 to 25 minutes.

Yeast bread was produced by mixing wheat flour (280 g), whole wheat flour (10 g), yeast (6 g; Baker's yeast, Lesaffre, Inc., France), and water (200 ml) and kneading the sourdough at once. First fermentation was then performed at 24 to 25° C. for 40 to 50 minutes. After molding, second fermentation was performed at 24 to 25° C. for 30 minutes. Subsequent scoring and baking were performed in the same manner as in the sourdough case. The produced bread was subjected to a drying process (105° C. for 24 hours), and as shown in Table 15 below, regular feed (AIN-93G) was used as the base feed, and 43% (weight ratio) was added when producing other feeds.

TABLE 15

| Components | Regular feed (AIN-93G) | B1* | B2** | B3*** | Gluten Feed**** |
|---|---|---|---|---|---|
| Casein | 200 | 149.10 | 149.10 | 149.10 | 155.00 |
| Sucrose | 100 | 100 | 100 | 100 | 100 |
| Dextrose | 132 | 132 | 132 | 132 | 132 |
| Corn Starch | 397.486 | 39.32 | 39.32 | 39.32 | 384 |
| Cellulose | 50 | 35.57 | 35.57 | 35.57 | 49.57 |
| Soybean Oil | 70 | 63.50 | 63.50 | 63.50 | 68.93 |
| Mineral mix | 35 | 35 | 35 | 35 | 35 |
| Vitamin mix | 10 | 10 | 10 | 10 | 10 |

TABLE 15-continued

| Components | Regular feed (AIN-93G) | B1* | B2** | B3*** | Gluten Feed**** |
|---|---|---|---|---|---|
| L-Cystine | 3 | 3 | 3 | 3 | 3 |
| Choline Bitartrate | 2.5 | 2.5 | 2.5 | 2.5 | 2.5 |
| Produced of dry bread or gluten | 0 | 430 | 430 | 430 | 60 |
| Total, g | 1000.0 | 1000.0 | 1000.0 | 1000.0 | 1000.0 |

*Feed supplemented with sourdough bread (43%) produced using the isolated strain;
**Feed supplemented with yeast bread (43%);
***Feed supplemented with sourdough bread (43%) produced using natural yeast strains;
****Only 6% of gluten supplemented with regular feed ("Glu")

Figure 10:
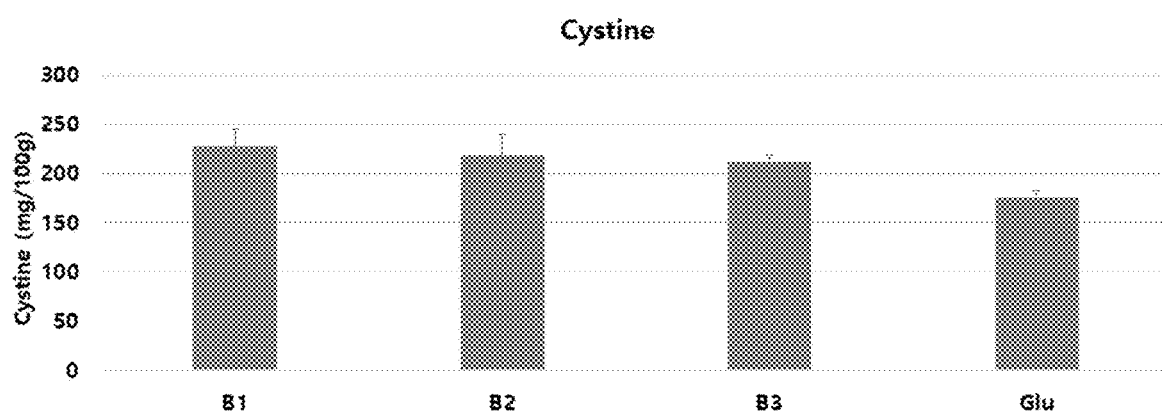
FIG. 10 is a graph showing the results of analyzing the content of free amino acid (cysteine) depending on the type of produced feed used in Experimental Example 2 of the present disclosure.
Figure 11:
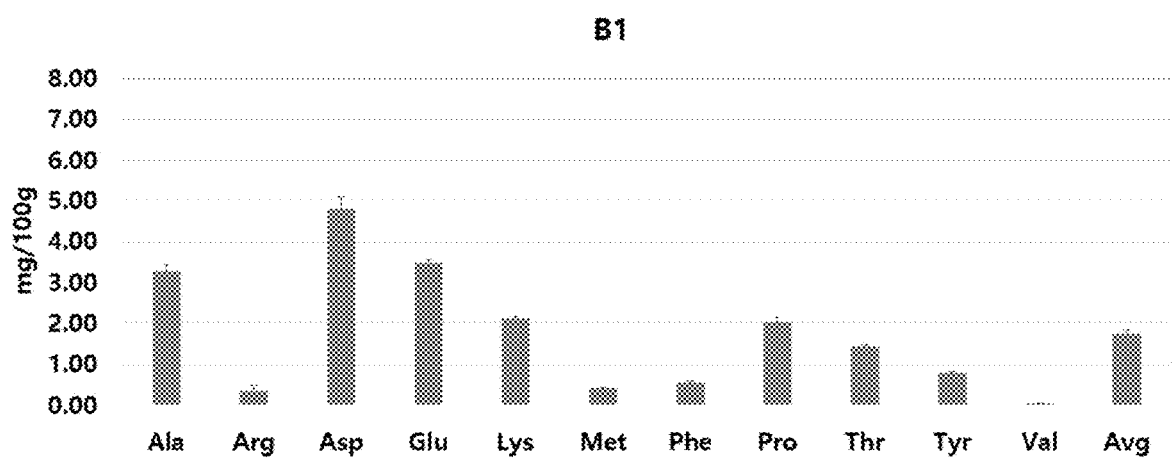
FIG. 11 is a graph showing the results of analyzing the content of dominant free amino acids in Sample B1 used in Experimental Example 2 of the present disclosure.
Figure 12:
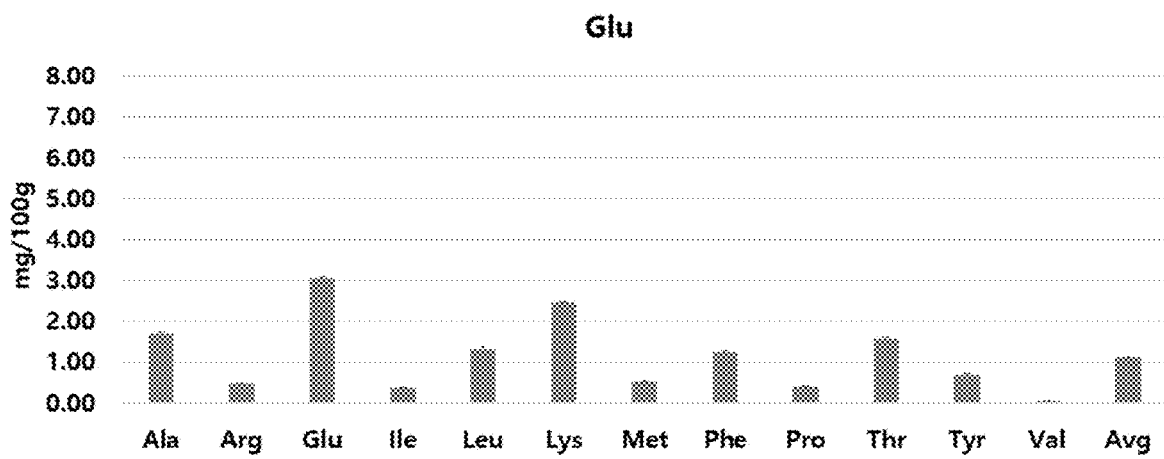
FIG. 12 is a graph showing the results of analyzing the content of dominant free amino acids in Sample Glu used in Experimental Example 2 of the present disclosure.
Figure 13:
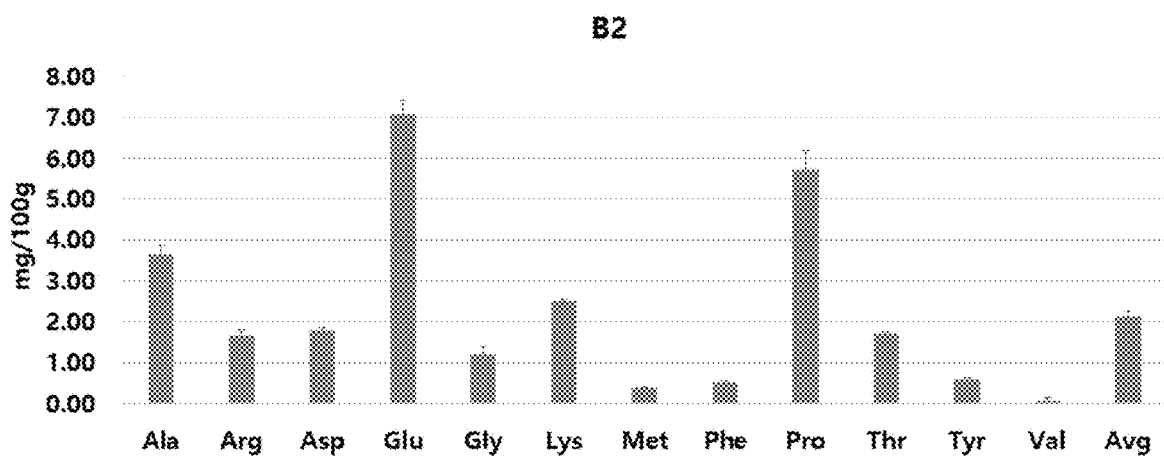
FIG. 13 is a graph showing the results of analyzing the content of dominant free amino acids in Sample B2 used in Experimental Example 2 of the present disclosure.
Figure 14:
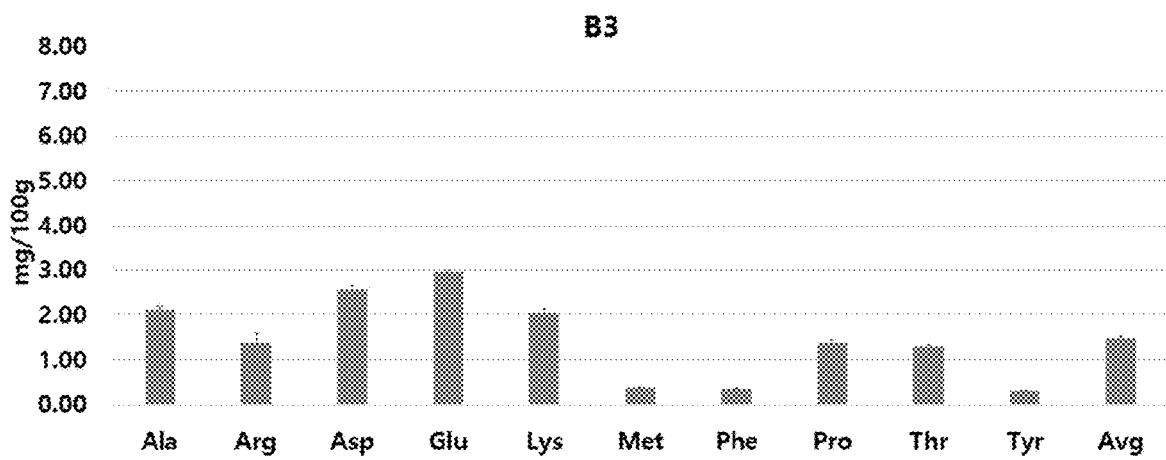
FIG. 14 is a graph showing the results of analyzing the content of dominant free amino acids in Sample B3 used in Experimental Example 2 of the present disclosure.

The content of free amino acid (cystine) according to the type of produced feed was analyzed, and the results are shown in FIG. 10. Referring to FIG. 10, sample Glu (176 mg/100 g) was the lowest, and other samples showed similar levels in the range of 211-227 mg/100 g.

The content of dominant free amino acid according to the type of produced feed was analyzed, and the results are shown in FIGS. 11 to 14. In the case of feed B1, an average content was 1.75 mg/100 g, and alanine, asparagine, and glutamic acid showed above-average content; in the case of feed Glu, an average content was 1.10 mg/100 g, and alanine, glutamic acid, lysine, and threonine showed above-average content. In the case of feed B2, an average content was 2.12 mg/100 g, and alanine, glutamic acid, lysine, and proline showed above-average content. For feed B3, an average content was 1.48 mg/100 g, and alanine, asparagine, glutamic acid, and lysine showed above-average content.

2-2. Changes in Immune Activity of Mice According to Addition of Feed: DSS-Induced Colitis Rat Test Inflammatory reactions generally occur in response to stimuli such as viral and microbial infections or foreign substances. Recently, many types of drugs for anti-inflammatory and immune system suppression have been studied, but side effects have been reported, so that efforts are being made to minimize side effects and utilize biological ingredients obtained from natural products and foods as much as possible. Bread is an important food in the daily diet of many people around the world. Although it is generally produced from refined white wheat flour, which lacks the nutrients, fiber, and bioactive components present in bran, the nutritional value of bread can be increased by adding functional ingredients. Probiotics are live microorganisms that can provide health benefits to humans, in this study, bread was produced using *Saccharomyces cerevisiae* Y3-1 (KCTC 15070BP), *Leuconostoc mesenteroides* M1-2 (KTCT 15071BP), and *Bacillus belezensis* Kh2-2 (KCTC14642BP) as yeast, lactic acid bacteria and *bacillus* bacteria, respectively, and the effect on anti-inflammatory activity was investigated in mice fed a feed produced from bread in a dextran sodium sulfate (DSS)-induced colitis model.

In Vivo Experiments: Experimental Design, Animals and Diet

Balb/c aged mice (11 months old) were reared at 23° C. for 12 hours in the animal laboratory of KYUNG HEE UNIVERSITY All animal studies were performed according to the instructions of the KYUNG HEE UNIVERSITY Laboratory Animal Use Ethics Committee. Basically, the test feed used in the diet was produced in three types: B1, B2, and B3. In other words, B1 was added to sourdough bread made with the sourdough starter (yeast:lactic acid bacteria:*Bacillus* species: 7:2:1 weight combination) developed in this study, and B2 was added to bread made without fermentation using commercial yeast, and B3 was added to bread made from sourdough as a natural starter by this research team.

Acute Colitis Caused by DSS

The test was implemented based on the dextran sulfate sodium (DSS) (MP Biomedicals, Ontario, CA, USA) colitis model proposed by Okayasu et al. The experimental animals were weighed after an adaptation period of one week, randomly divided into five groups, and each group was composed of 6 mice. Rats in the normal group (control) were orally administered distilled water and fed regular feed without DSS for 28 days. The colitis group (DSS) was administered distilled water for 28 days, diluted 2.5% DSS was freely supplied for 8 days (28 to 35 days), and regular feed was fed. The remaining three groups were fed B1, B2, and B3 feed groups ad libitum, respectively.

Disease Activity Index (DAI) of DSS-Induced Colitis Model

The intestinal disease activity index was evaluated using the scoring system in Table 16 below, and the disease activity index (DAI) was quantified using the following formula.

DAI=(Weight Loss Score)+(Stool Consistency Score (the thinner the higher the score: check for diarrhea))+(Rectal Bleeding Score)/3

After evaluating three factors for each treated group, the average value was calculated.

TABLE 16

| Score | Weight loss | Stool consistency | Rectal bleeding |
|---|---|---|---|
| 0 | — | Normal | Normal |
| 1 | 1 to 5% | — | Trace amount |
| 2 | 5 to 10% | Loose feces | Occult blood + |
| 3 | 10 to 20% | — | Occult blood ++ |
| 4 | >20% | Diarrhea | Severe bleeding |

Cytokine Secretion in Rat Serum

Blood samples were collected in test tubes and centrifuged (2000 g) for 10 min at 4° C., and the supernatant (serum) was stored at −80° C. until further analysis. Enzyme-linked immunosorbent assay (ELISA) was tested to quantify serum levels of interleukin (IL)-6, IL-17, IL-10, MPO, and granulocyte macrophage colony-stimulating factor (GM-CSF).

Western Blot Analysis

After pulverizing the colon tissue, Pierce™ RIPA Buffer (Thermo Scientific, Rockford, USA) was added and centrifuged at 12,000 rpm for 20 minutes at 4° C. The Bradford method was used to measure protein concentration. Total protein (50 ng) was run on a 10% sodium dodecyl sulfate-polyacrylamide gel electrophoresis (SDS-PAGE) gel, and the separated protein bands were transferred to a polyvinylidene fluoride (PVDF) membrane. After 1 hour, the membrane was blocked with 5% skim milk and then investigated using the appropriate primary antibody overnight at 4° C. The membrane was cultured with horseradish peroxidase-linked secondary antibody (goat anti-mouse/rabbit IgG 1:2000) for 2 hours at room temperature. Lastly, the degree of quantitative expression was measured by the enhanced intensity of chemical expression in the Alliance Mini HD9 (Uvitec) detection system (GenDEPot, USA).

Clinical Test Symptom Test Results Due to DSS Induction in Mice

To evaluate the preventive effect of feeds B1, B2, and B3, B1, B2, and B3 were fed for 28 days. After that, DSS was administered for 8 days to induce acute colitis, and the preventive effects of B1, B2, and B3 on DSS-induced acute colitis were analyzed in a mouse model.

It is known that the early symptom of ulcerative colitis in rats is weight loss. Therefore, as a result of checking the mouse body weight once every two days for 8 days, weight loss was confirmed after ingestion of 2.5% DSS and in all experimental groups. However, mice in the B1, B2, and B3 treated groups showed a slight recovery in body weight compared to mice in a DSS single group. The these study results suggested that although there was no significant weight gain on day 8, oral administration of B1, B2, and B3 may have an effect in preventing weight loss in the ulcerative colitis mouse model.

Figure 15:
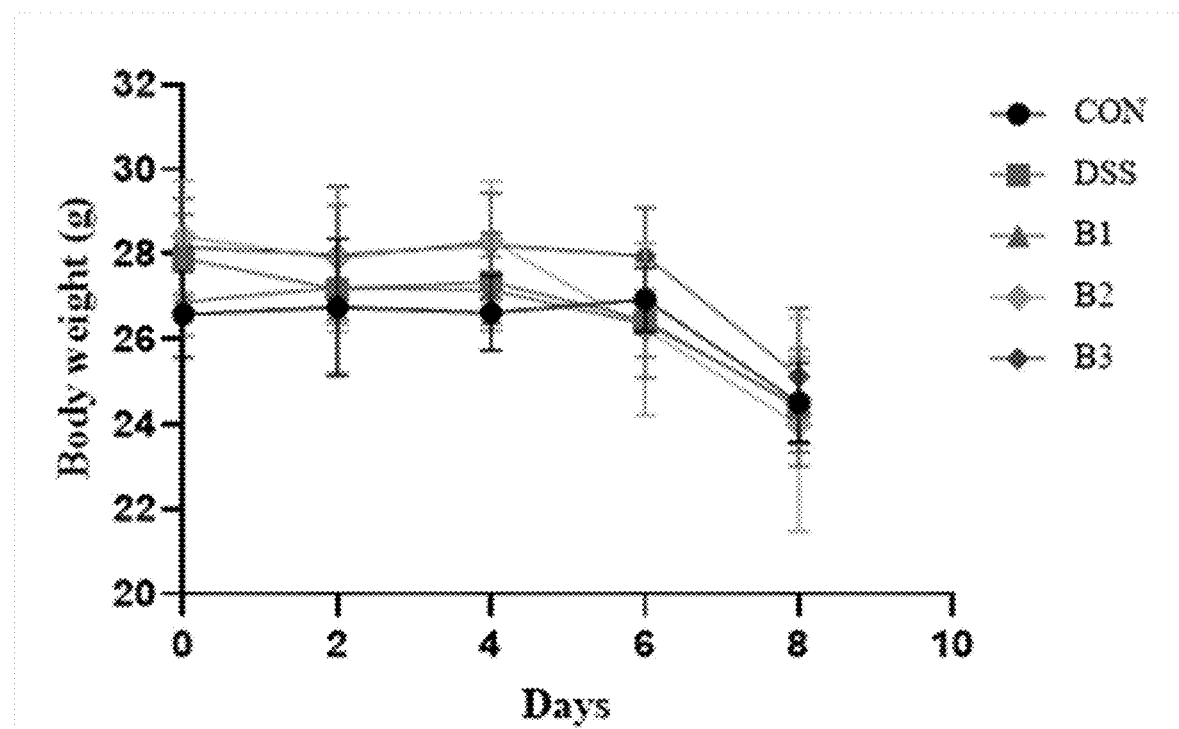
FIG. 15 is a graph showing body weight changes for an untreated group, a DSS only treated group, a DSS/B1 administration group, a DSS/B2 administration group, and a DSS/B3 administration group in Experimental Example 2 of the present disclosure.
Figure 16:
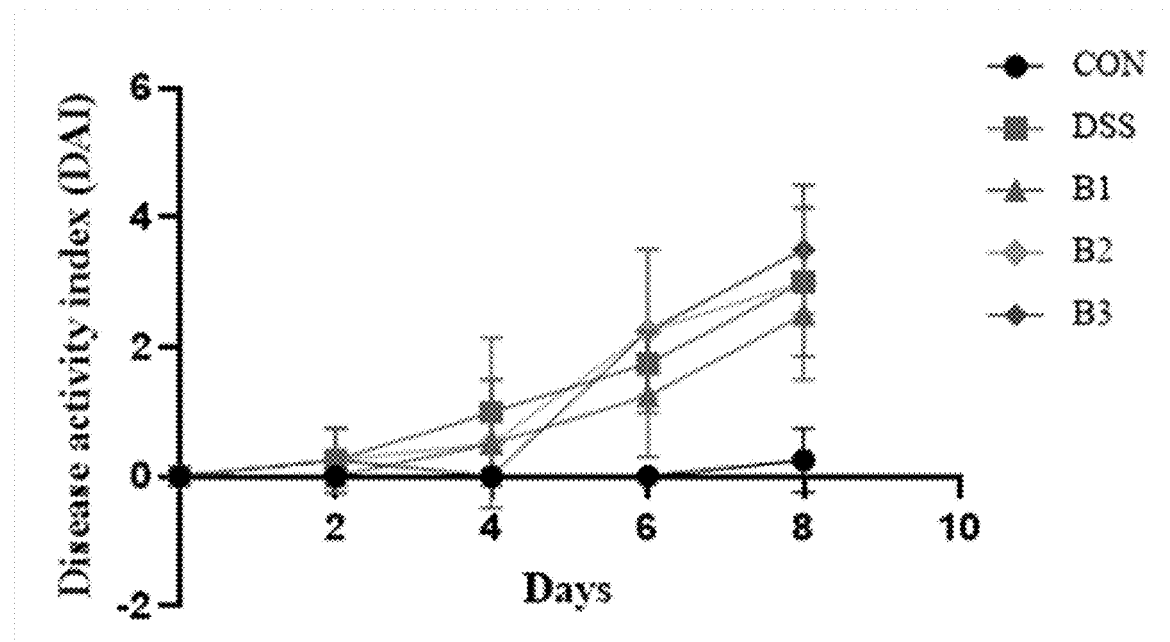
FIG. 16 is a graph showing changes of disease activity index (DAI) for an untreated group, a DSS only treated group, a DSS/B1 administration group, a DSS/B2 administration group, and a DSS/B3 administration group in Experimental Example 2 of the present disclosure.

Next, when DSS was administered for 8 days, the degree of induction and improvement of colitis was analyzed by measuring body weight change, stool consistency, and rectal bleeding every 2 days, and the results are shown in FIGS. 15 and 16. Referring to FIG. 16, from the day 4 of DSS administration, DAI began to decrease along with B1 and B2, but the B3 treated group did not recover. The most notable improvement in 8-day colitis was confirmed in the B1 treated group. In particular, DAI was found to be strongly reduced in the group administered B1 for 35 days compared to the DSS single group. In addition, DAI decreased in the B2 administered group, but was not significant compared to the DSS single group.

Figure 17:
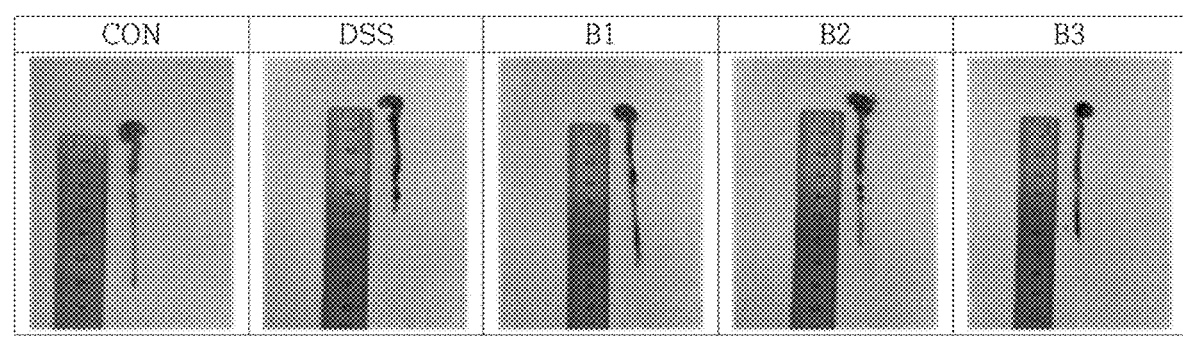
FIG. 17 is a photograph showing the results of measuring the colon length for an untreated group, a DSS only treated group, a DSS/B1 administration group, a DSS/B2 administration group, and a DSS/B3 administration group in Experimental Example 2 of the present disclosure.
Figure 18:
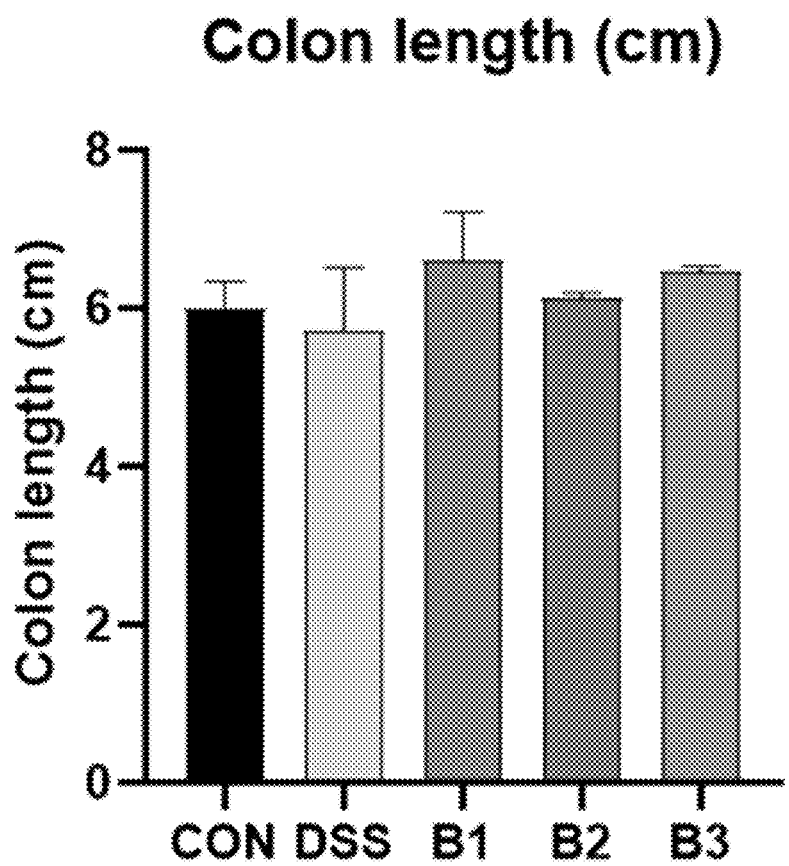
FIG. 18 is a graph showing the results of measuring the colon length for an untreated group, a DSS only treated group, a DSS/B1 administration group, a DSS/B2 administration group, and a DSS/B3 administration group in Experimental Example 2 of the present disclosure.

Mice were administered 2.5% DSS for 8 days and then sacrificed on the day 9, large intestine length of each mouse was measured, and the results are shown in FIGS. 17 and 18. Referring to FIGS. 17 and 18, it was confirmed that the colon length of DSS-administered mice was shortened by treatment with B1, B2, and B3. In addition, it was confirmed that the B1 administration group showed better colon and cecum morphology than the normal group. These results suggest that B1 can improve the severity of colitis in mice.

Figure 19:
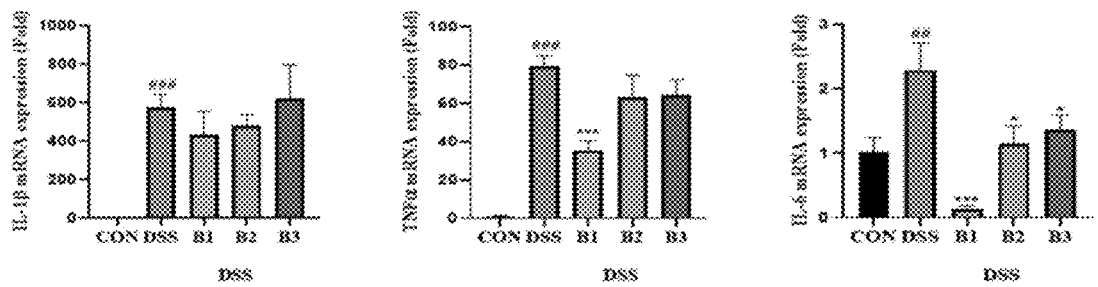
FIG. 19 is a graph showing the mRNA expression levels of IL-1β, TNF-α, and IL-6 for an untreated group, a DSS only treated group, a DSS/B1 administration group, a DSS/B2 administration group, and a DSS/B3 administration group in Experimental Example 2 of the present disclosure.

To further demonstrate the anti-inflammatory capacity of B1, B2 and B3, effects on cytokine expression was evaluated and the results are shown in FIG. 19. Referring to FIG. 19, the mRNA expression of IL-1, TNF-$\alpha$, and IL-6 was dramatically increased through DSS treatment in the mouse colon. However, the B1 group strongly suppressed the DSS-induced increase in IL-1 and TNF-$\alpha$ mRNA levels compared to the B2 and B3 groups. The B3 group slightly reduced TNF-$\beta$ gene expression, but did not suppress IL-10 gene expression in DSS-induced mice. As a result, B1 showed anti-inflammatory activity in mice with DSS-induced colitis by suppressing inflammatory cytokines such as IL-1$\alpha$, IL-6, and TNF-$\beta$.

Figure 20:
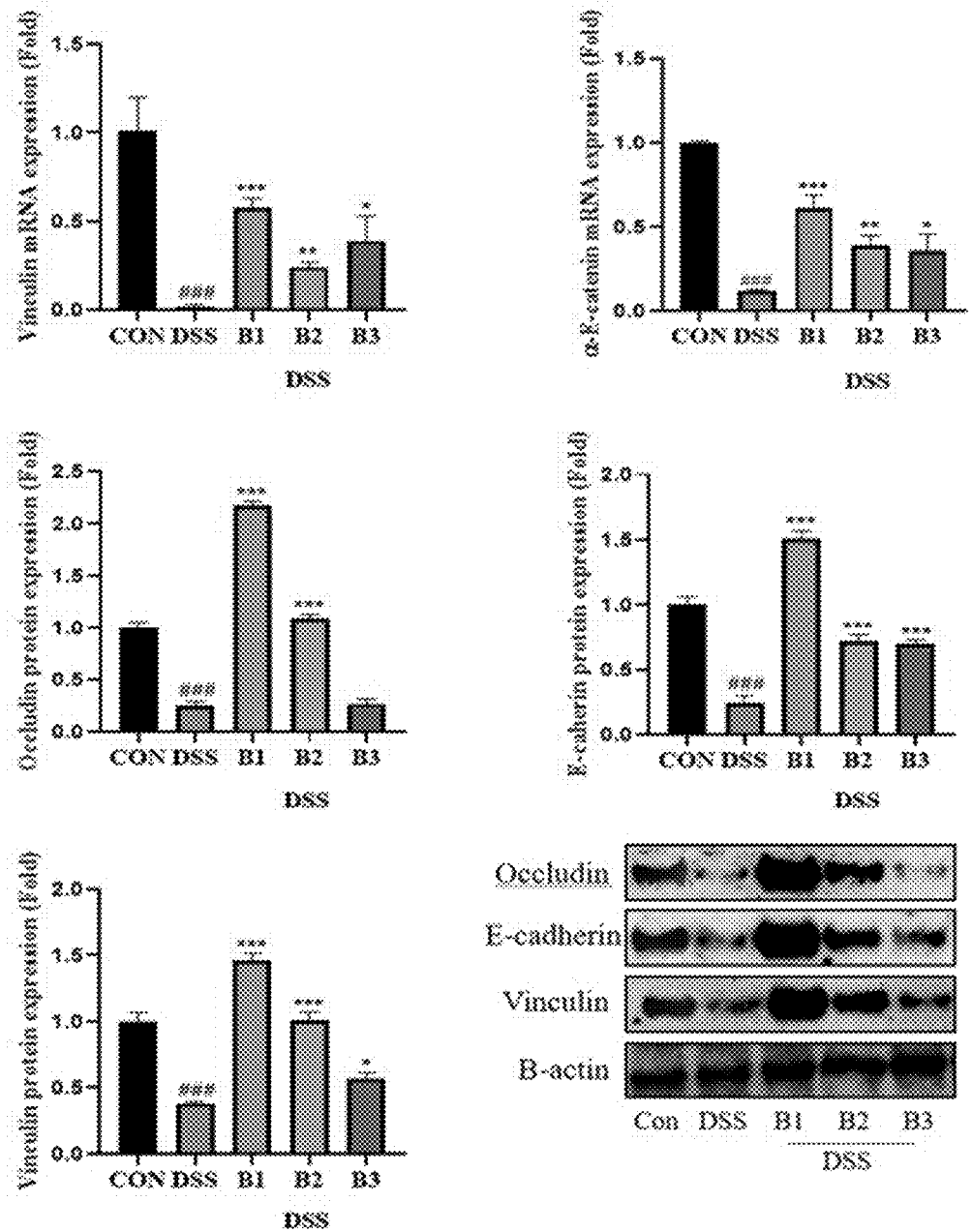
FIG. 20 is a graph showing the expression degree of vinculin, α-E-catenin, occludin, E-cadherin and vinculin proteins for an untreated group, a DSS only treated group, a DSS/B1 administration group, a DSS/B2 administration group, and a DSS/B3 administration group in Experimental Example 2 of the present disclosure.

Effects of B1. B2. B3 on Large Intestine Leukocyte Involvement in DSS-Induced Colitis in Mice The expression of the five proteins shown in the graph above was tested using Western blotting, and the DSS treated group showed lower expression of the five proteins compared to the control group (FIG. 20). In the case of B1, protein expression was higher than in the DSS group, and enterocyte-specific protein expression was higher than that of the control group, with B1 showing the highest expression, and in the case of B2, higher protein expression was observed compared to the DSS group, but lower than that of B1. In the case of B3, although the expression of Occludin protein was low, it showed a significantly higher expression value compared to the DSS group.

Figure 21:
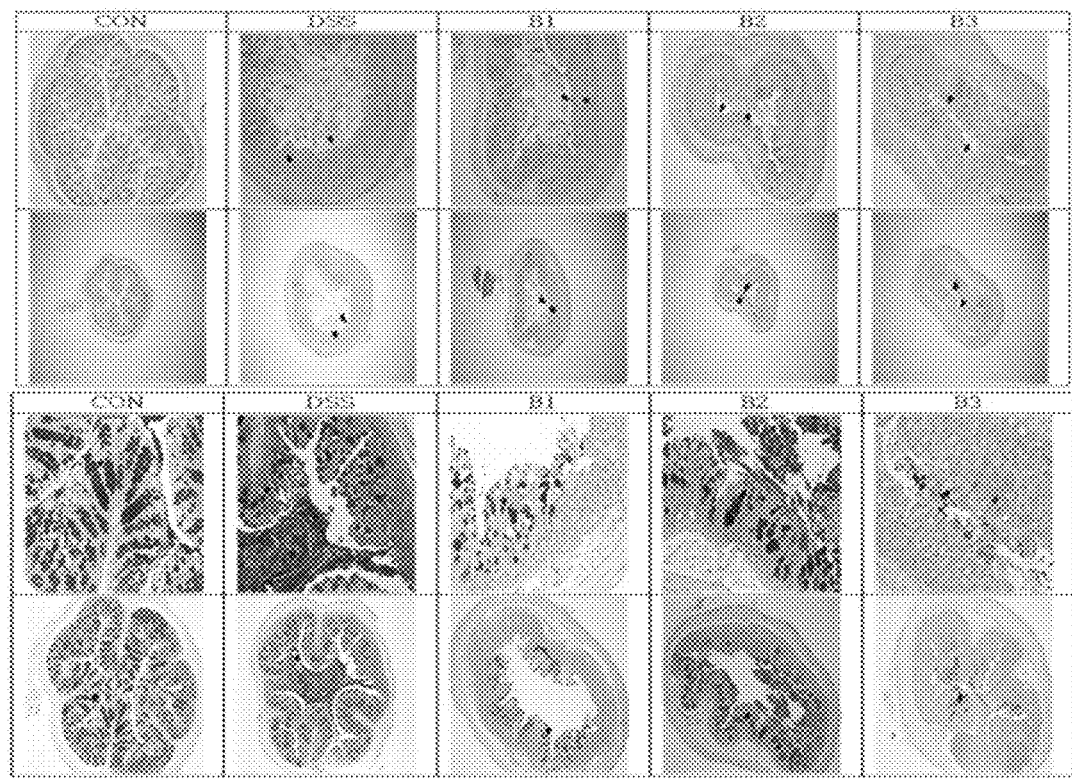
FIG. 21 is a photograph showing the results of observing the degree of inflammation and cell changes in the colonic mucosa from a histological perspective for an untreated group, a DSS only treated group, a DSS/B1 administration group, a DSS/B2 administration group, and a DSS/B3 administration group in Experimental Example 2 of the present disclosure.

The results of observing the degree of inflammation and cellular changes in the large intestine mucosa from a histological perspective are shown in FIG. 21. As shown in FIG. 21, the DSS treated group showed significant inflammation and movement damage compared to the control group, but in the case of the sourdough bread-containing feed groups (B1 and B3), there was a tendency for some degree of recovery. In addition, looking at the loss of goblet cells, it was found that the lost goblet cells were recovered to some extent in the cases of B1 and B3 compared to the DSS treated group.

2-3. Changes in Intestinal Microbial Community of Mice According to the Addition of Feed Three or five replicate samples from each group were collected and analyzed. In microbial community analysis, total DNA was extracted using analysis at CJ Bioscience (formerly Chunlab Co., Ltd.) (Seoul, Korea), the 16rRNA gene sequence was analyzed using the NGS analysis system, and then alpha diversity and beta diversity were analyzed using an own analysis platform. Dendrogram cluster analysis of the microbial community at the species level was performed using SPSS Statistics version 29. The intestinal microorganisms of five feed groups used in the experiment were compared by analyzing the microorganisms present in the stool of mice.

Figure 22:
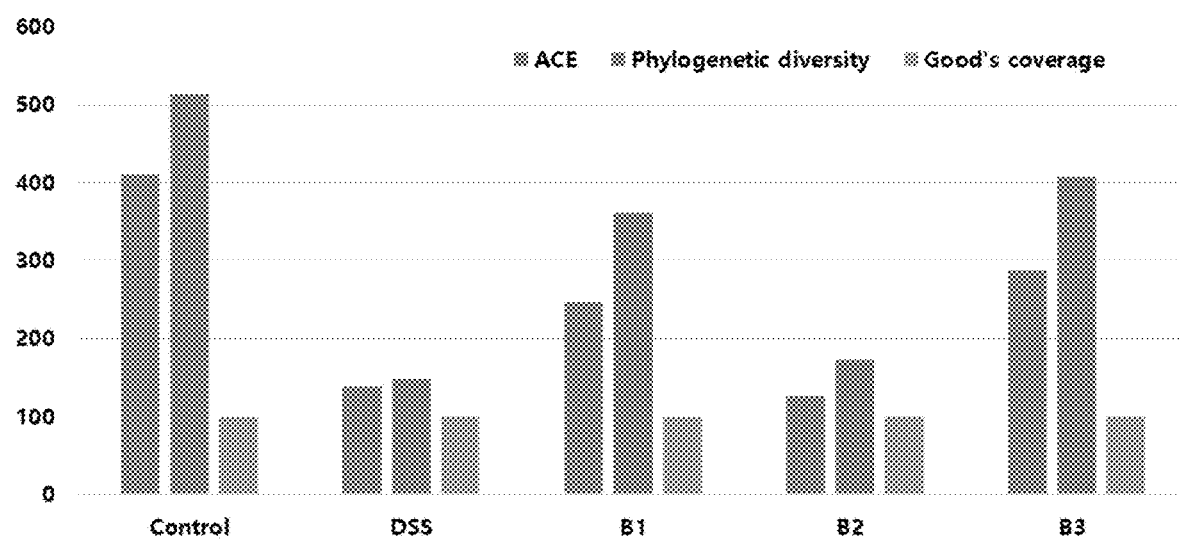
FIG. 22 is a graph showing the species diversity and phylogenetic diversity of intestinal microorganisms for an untreated group, a DSS only treated group, a DSS/B1 administration group, a DSS/B2 administration group, and a DSS/B3 administration group in Experimental Example 2 of the present disclosure.

The species diversity of intestinal microorganisms present in rat feces for five groups was compared (FIG. 22). ACE and phylogenetic diversity were highest in the control group, and was highest in the order of the B3 feed administration group and the B1 feed administration group. Species diversity was lowest in the DSS treated group. Therefore, similar to the above results, the intestinal microbial community changed by DSS was thought to restore species diversity to some extent when administered B3 and B1 feed.

Figure 23:
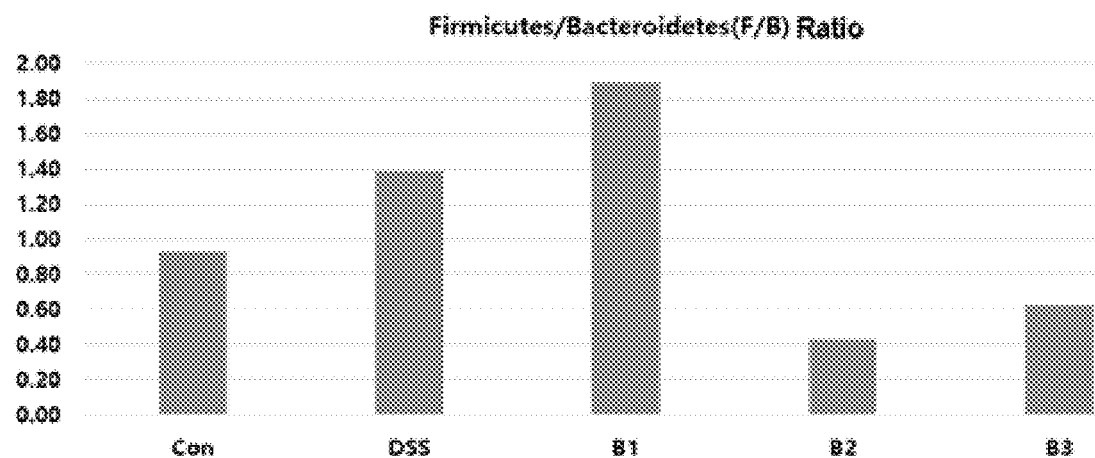
FIG. 23 is a graph showing the Firmicutes/Bacteroidetes ratio and Bacteroidetes/Firmicutes ratio of intestinal microorganisms for an untreated group, a DSS only treated group, a DSS/B1 administration group, a DSS/B2 administration group, and a DSS/B3 administration group in Experimental Example 2 of the present disclosure.
Figure 24:
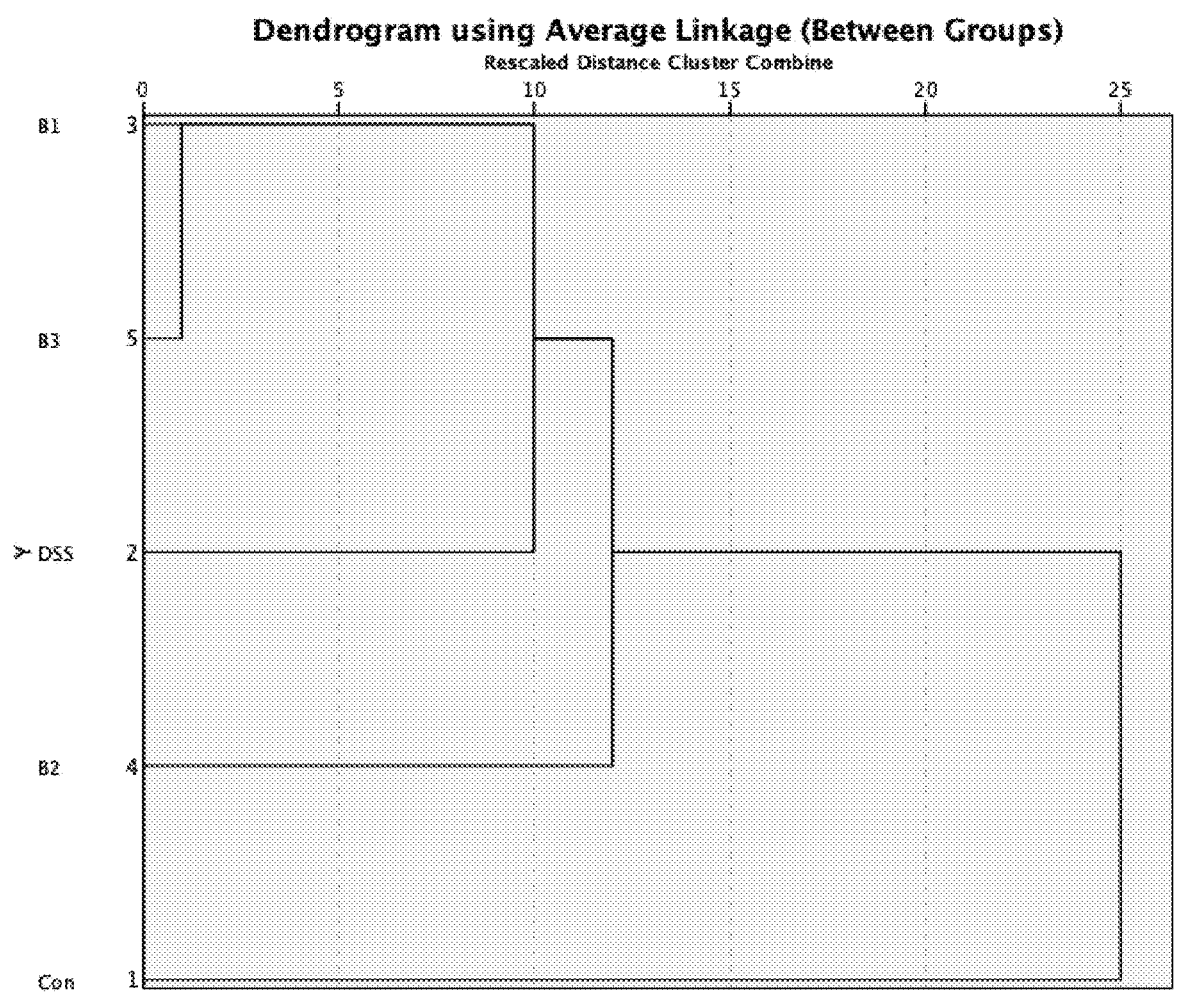
FIG. 24 is a graph showing the dendrogram cluster analysis generated according to 14 species of intestinal microorganisms for an untreated group, a DSS only treated group, a DSS/B1 administration group, a DSS/B2 administration group, and a DSS/B3 administration group in Experimental Example 2 of the present disclosure.

The firmicutes/bacteroidetes (F/B) ratio of intestinal microorganisms present in rat feces for the five groups was compared (FIG. 23). The F/B ratio showed the highest value in the feed treated group (1.89) and DSS treated group (1.39), while the control group (0.93), B2 feed administration group (0.43), and B3 feed administration group (0.62) showed low values. This indicates that there is no clear correlation between the F/B ratio between the sourdough bread-based feed diet group and the general feed diet group. It is widely accepted that the F/B ratio has an important impact on maintaining normal intestinal homeostasis. An increase or decrease in the F/B ratio is considered a dysbiosis, with the former commonly observed in obesity and the latter in inflammatory bowel disease (IBD) (Stojanov et al., 2020). Meanwhile, the high F/B ratio known to be associated with obesity is an index that takes into account a high level of taxonomic rank, i.e. phylum, and is therefore considered unreliable in future studies with more data. The meta-analysis could not find a clear trend between F/B ratio and obesity, suggesting that the complexity of how intestinal microorganisms regulate obesity is much greater than a simple imbalance between these two phyla (Tseng & Wu, 2019). In addition, it is difficult to relate the F/B ratio to a determined health status and more specifically to consider it as a characteristic of obesity (Magne et al., 2020). Therefore, in the present disclosure, it is considered difficult to use the F/B ratio as a marker for predicting inflammation in the mouse intestine.

Figure 25:
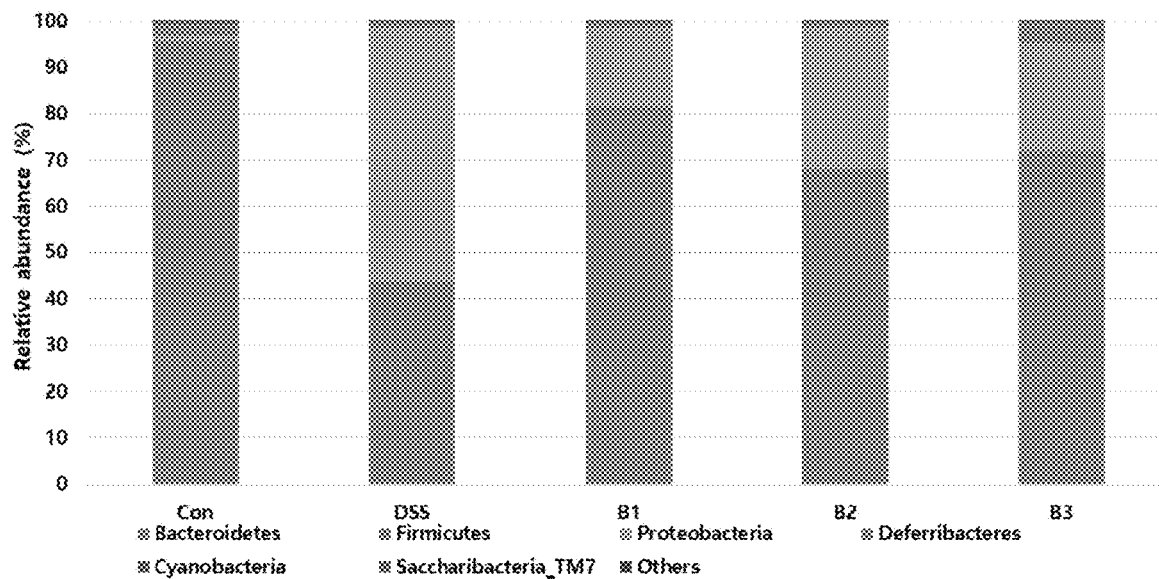
FIG. 25 is a graph showing the distribution of the phylum of intestinal microorganisms for an untreated group, a DSS only treated group, a DSS/B1 administration group, a DSS/B2 administration group, and a DSS/B3 administration group in Experimental Example 2 of the present disclosure.

Bacteroidetes phylum showed the highest level (49.6%) in the control group and the lowest level (18.3%) in the DSS treated group (FIG. 25). In the case of Firmicutes, the B1 treated group and the control group showed relatively high levels (53.4% and 46%, respectively), while the B2, DSS, and B3 treated groups showed relatively low levels (21-28%). In the case of Proteobacteria containing pathogens compared to the control group, the DSS treated group (55.1%) was the highest and the control and B1 treated groups (1.4% and 16.9%, respectively) was the lowest. In other words, it was judged to restore the intestinal microflora changed by DSS to a normal state. Changes in the microbial community appeared to contribute to alleviating intestinal DSS-induced pathogen proliferation and inflammation, as beneficial bacteria in the mouse's gut became dominated by sourdough bread feeding.

Figure 26:
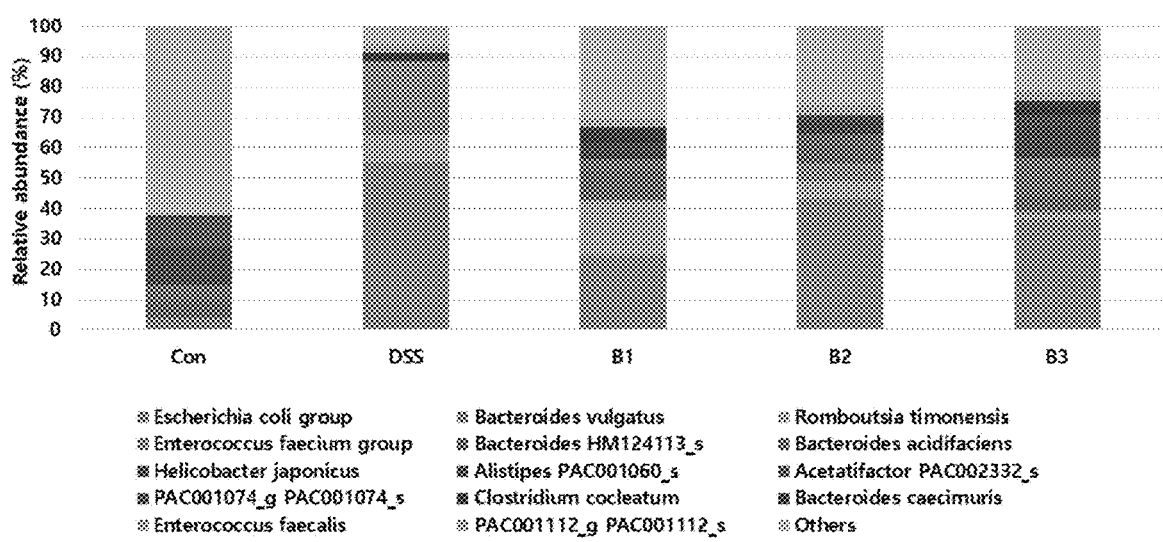
FIG. 26 is a graph showing the distribution of intestinal microbial species observed in the feces of intestinal microorganisms for an untreated group, a DSS only treated group, a DSS/B1 administration group, a DSS/B2 administration group, and a DSS/B3 administration group in Experimental Example 2 of the present disclosure.

FIG. 26 shows the species distribution of intestinal microorganisms in mouse stool for five groups. In the control group, *Alistipes* PAC001060_s (12.3%), *Acetatifactor* PAC002332_s (9%), and *Bacteroides acidifaciens* (5.9%) were dominant, and in the DSS treated group, *Bacteroides vulgatus*, *Escherichia coli*, and *Enterococcus faecium* showed a distribution of 28.9, 26.4, and 24.4%, respectively. In the case of the B1 diet, *Bacteroides vulgatus*, *Romboutsia timonensis*, and *Bacteroides* HM124113_s were dominant at 18.7, 18.5, and 9.3%, respectively. In addition, in the B2 treated group, *E. coli* (43.1%), *Bacteroides* HM124113_s (9.4%), and *Enterococcus faecium* (6.0%) showed the highest distribution in that order. In addition, in the B3 treated group, *Bacteroides vulgatus* (22.9%), *Escherichia coli* (13.9%), and *Bacteroides acidifaciens* (13.2%) were dominant in that order.

The genus *Alistipes* has recently been recognized as an intestinal microbial community associated with intestinal inflammation, cancer, and mental disorder, and this genus has been shown to have preventive effects against some diseases, including liver fibrosis, colitis, cancer immunotherapy, and cardiovascular disease (Parker et al., 2020). Rats fed a tryptophan-deficient diet significantly increased IL-6, IL-17A, and IL-1 and increased abundance of the *Acetatifactor* genus (Yusufu et al., 2021). In addition, these genera did not dominate in the control group, where microbial diversity was higher than in the other treated groups. Production of inflammatory cytokines GM-CSF, IL-6, and IFN-7 was found to be evidence of severe inflammation induced by *E. coli* strains of sequence type 129 (ST129) and ST375 after DSS administration (Kittana et al., 2018). *E. faecium* strains derived from UC patients may represent an inflammatory genotype that causes colitis (Seishima et al., 2019). In this study, the *Escherichia coli* and *Enterococcus faecium* groups composed 49-51% of the entire population in the DSS and B2 diet groups, indicating that these genera were dominant in inflammatory conditions. The protective role of *B. vulgatus* FTJ appears to be due to the regulation of cytokine production in colonic tissue and structural regulation of the intestinal microbiota (Wang et al., 2022).

Feeding live *B. vulgatus* and *B. dorei* significantly improved endotoxemia by attenuating the formation of atherosclerotic lesions in mice prone to atherosclerosis and then reduced pro-inflammatory immune responses by reducing intestinal microbial lipopolysaccharide production (Yoshida et al., 2018). Microbial taxa such as *Faecalibacterium, Bacteroides*, and *Romboutsia* appear to be deficient in cancer-causing mucosal and adenomatous polyps, suggesting that this genus may be used as a microbial biomarker for early tumorigenesis (Mangifesta et al., 2018). Therefore, the presence of *Bacteroides vulgatus, Romboutsia timonensis*, and *Bacteroides* HMI124113_s in the B1 diet was considered to reduce inflammation in mice in this study. *E. coli* and *Enterococcus faecium* groups were significantly decreased in the B1 and B3 diet groups, indicating that *Bacteroides vulgatus, Romboutsia timonensis*, and *Bacteroides acidifaciens* in sourdough bread may have inhibited the growth of colitis-causing bacteria. *B. vulgatus* 7K1 supplementation is a potentially effective treatment for alleviating colitis and provides a scientific basis for screening probiotics with anti-colitis effects (Li et al., 2021).

Figure 27:
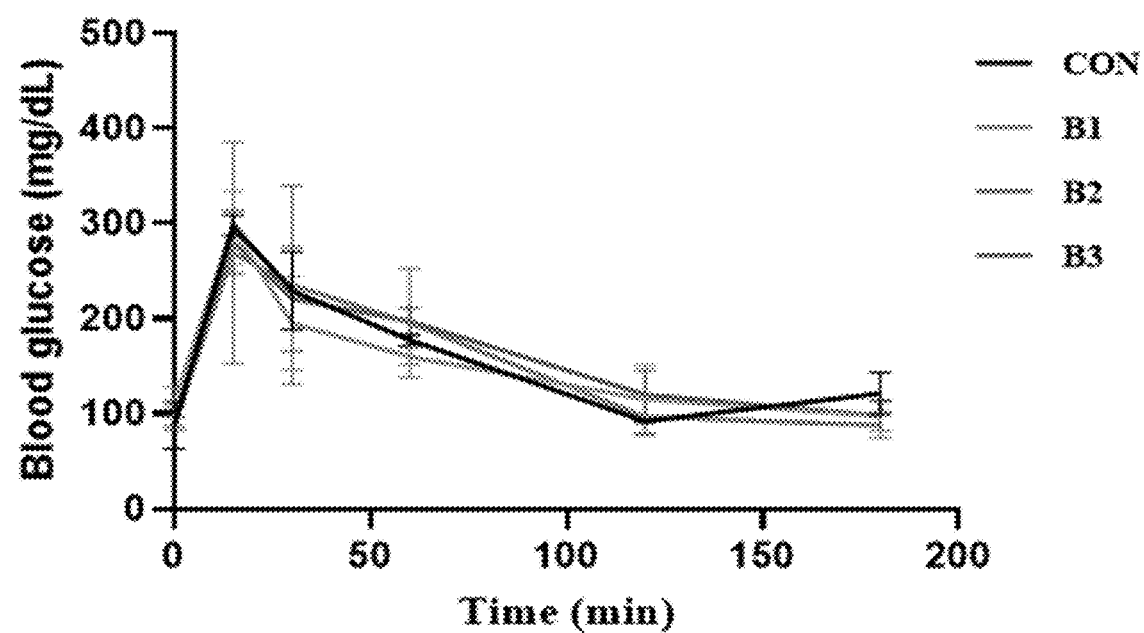
FIG. 27 is a graph showing changes in blood glucose for an untreated group, a DSS only treated group, a DSS/B1 administration group, a DSS/B2 administration group, and a DSS/B3 administration group in Experimental Example 2 of the present disclosure.

Experimental Example 3: Analysis of Effect on Blood Glucose in Mice According to the Addition of Sourdough-Based Feed As a result of evaluating blood glucose over time by implementing a glucose tolerance test, the B1 treated group showed the best effect in lowering blood glucose within 1 hour (FIG. 27). However, blood glucose returned to normal within 2 hours in all treated groups. One interesting thing is that when B1 feed was administered, blood glucose level was lowest within 1 hour after feeding, showing inhibition of blood glucose increase.

REFERENCES

1. Arora et al., 2021. Thirty years of knowledge on sourdough fermentation: A systematic review, Trends in Food Science & Technology Volume 108, February 2021, Pages 71-83
2. Parker, B J. 2020. The Genus *Alistipes*: Gut Bacteria With Emerging Implications to Inflammation, Cancer, and Mental Health. Front. Immunol., https://doi.org/10.3389/fimmu.2020.00906
3. Yusufu, I.; Ding, K.; Smith, K.; Wankhade, U. D.; Sahay, B.; Patterson, G. T.; Pacholczyk, R.; Adusumilli, S.; Hamrick, M. W.; Hill, W. D.; et al. A Tryptophan-Deficient Diet Induces Gut Microbiota Dysbiosis and Increases Systemic Inflammation in Aged Mice. Int. J. Mol. Sci. 2021, 22, 5005. https://doi.org/10.3390/ijms22095005
4. Kittana H, Gomes-Neto J C, Heck K, Geis A L, Segura Munoz R R, Cody L A, Schmaltz R J, Bindels L B, Sinha R, Hostetter J M, Benson A K and Ramer-Tait A E (2018) Commensal *Escherichia coli* Strains Can Promote Intestinal Inflammation via Differential Interleukin-6 Production. Front. Immunol. 9:2318. doi: 10.3389/fimmu.2018.02318
5. Seishima, J., Iida, N., Kitamura, K. et al. Gut-derived *Enterococcus faecium* from ulcerative colitis patients promotes colitis in a genetically susceptible mouse host. Genome Biol 20, 252 (2019). https://doi.org/10.1186/s13059-019-1879-9
6. Wang, Hesuiyuan Qing Wang, Chengmao Yang, Mingming Guo, Xiaoyue Cui, Zhe Jing, Yujie Liu, Wanjin Qiao, Hang Qi, Hongyang Zhang, Xu Zhang, Na Zhao, Mengjuan Zhang, Min Chen, Song Zhang, Haijin Xu, Liging Zhao, Mingqiang Qiao & Zhenzhou Wu (2022) Bacteroidesacidifaciens in the gut plays a protective role against CD95-mediated liver injury, Gut Microbes, 14:1, 2027853, DOI: 10.1080/19490976.2022.2027853
7. Naofumi Yoshida, Takuo Emoto, Tomoya Yamashita, Hikaru Watanabe, Tomohiro Hayashi, Tokiko Tabata, Namiko Hoshi, Naoya Hatano, Genki Ozawa, Naoto Sasaki, Taiji Mizoguchi, Hilman Zulkifli Amin, Yushi Hirota, Wataru Ogawa, Takuji Yamada and Ken-ichi Hirata. *Bacteroides vulgatus* and *Bacteroides dorei* Reduce Gut Microbial Lipopolysaccharide Production and Inhibit Atherosclerosis, Originally published 15 Aug. 2018https://doi.org/10.1161/CIRCULATIONAHA.118.033714Circulation. 2018; 138: 2486-2498
8. Mangifesta, M., Mancabelli, L., Milani, C. et al. 2018. Mucosal microbiota of intestinal polyps reveals putative biomarkers of colorectal cancer. Sci Rep 8, 13974 https://doi.org/10.1038/s41598-018-32413-2
9. Sijia Li, Chen Wang, Chengcheng Zhang, Yanhong Luo, [1,2]Qiangian Cheng, Leilei Yu, and Zhen Sun. 2021. Evaluation of the Effects of Different *Bacteroides vulgatus* Strains against DSS-Induced Colitis. Journal of Immunology Research https://doi.org/10.1155/2021/9117805 Volume 2021|Article ID 9117805|
10. Stojanov, S., Ales Berlec and Borut Strukelj. 2020. The Influence of Probiotics on the Firmicutes/Bacteroidetes Ratio in the Treatment of Obesity and Inflammatory Bowel disease. Microorganisms 2020, 8, 1715; doi: 10.3390/microorganisms8111715 w
11. Tseng, Ching-Hung and Chun-Ying Wu. 2019. The gut microbiome in obesity. Journal of the Formosan Medical Association 118, Supplement 1, Pages S3-S9
12. Magne, F., Martin Gotteland, Lea Gauthier, Alejandra Zazueta, Susana Pesoa, Paola Navarrete and Ramadass Balamurugan. The Firmicutes/Bacteroidetes Ratio: A Relevant Marker of Gut Dysbiosis in Obese Patients? Nutrients 2020, 12, 1474; doi:10.3390/nu12051474

DEPOSIT NUMBERS

Depository Institution Name: Korea Institute of Biotechnology and Biotechnology
Deposit number: KCTC15070BP
Deposit Date: 20220901
Depository Institution Name: Korea Institute of Biotechnology and Biotechnology
Deposit number: KCTC15071BP
Deposit Date: 20220901
Depository Institution Name: Korea Institute of Biotechnology and Biotechnology
Deposit number: KCTC14642BP
Deposit Date: 20210722

What is claimed is:

1. A starter for preparing sourdough comprising:

*Saccharomyces cerevisiae* Y3-1 (KCTC 15070BP), *Leuconostoc mesenteroides* M1-2 (KCTC 15071BP), and *Bacillus belezensis* Kh2-2 (KCTC 14642BP).

2. The Starter of claim 1, wherein the *Saccharomyces cerevisiae* Y3-1 (KCTC 15070BP), *Leuconostoc mesenteroides* M1-2 (KCTC 15071BP), and *Bacillus belezensis* Kh2-2 (KCTC 14642BP) are used in a weight ratio of 6 to 7:2 to 3:1 to 2.

3. Sourdough produced using the starter of claim 1.

4. A bakery product comprising the sourdough of claim 3.

5. The bakery product of claim 4, wherein the bakery product is bread, biscuits, pies, crackers or wafers.

* * * * *

SEQUENCE LISTING

```
Sequence total quantity: 4
SEQ ID NO: 1            moltype = DNA   length = 1371
FEATURE                 Location/Qualifiers
source                  1..1371
                        mol_type = genomic DNA
                        organism = Leuconostoc mesenteroides
SEQUENCE: 1
gaaaggtgct tgcacctttc agtgagtggc gaacgggtga gtaacacgtg gacaacctgc    60
ctcaaggctg gggataacat ttggaaacag atgctaatac cgaataaaac ttagtgtcgc   120
aggacacaaa gttaaaaggc gcttcggcgt cacctagaga tggatccgcg gtgcattagt   180
tagttggtgg ggtaaaggcc taccaagaca atgatgcata gcctaattga gagactgatc   240
ggccacattg ggactgaaac acggcccaaa ctcctacggg aggctgcagt agggaatctt   300
ccacaatggg cgaaagcctg atggagcaac gccacgtgtg tgatgaaggc tttcgggtcg   360
taaagcactg ttgatggga aaaacagcta gataggaaa tgattttagt ttgacggtac   420
cataccagaa agggacggct aaatacgtgc cagcagccgc ggtaatacgt atgtcccgag   480
```

```
cgttatccgg  atttattggg  cgtaaagcga  gcgcagacgg  tttattaagt  ctgatgtgaa  540
agcccggagc  tcaactccgg  aatggcattg  gaaactggtt  aacttgagtg  cagtagaggt  600
aagtggaact  ccatgtgtag  cggtggaatg  cgtagatata  tggaagaaca  ccagtggcga  660
aggcggctta  ctggactgca  actgacgttg  aggctcgaaa  gtgtgggtag  caaacaggat  720
tagataccct  ggtagtccac  accgtaaacg  atgaacacta  ggtgttagga  ggtttccgcc  780
tcttagtgcc  gaagctaacg  cattaagtgt  tccgcctggg  gagtacgacc  gcaaggttga  840
aactcaaagg  aattgacggg  gacccgcaca  agcggtggag  catgtggttt  aattcgaagc  900
aacgcgaaga  accttaccag  gtcttgacat  ccttttgaagc  ttttagagat  agaagtgttc  960
tcttcggaga  caaagtgaca  ggtggtgcat  ggtcgtcgtc  agctcgtgtc  gtgagatgtt  1020
gggttaagtc  ccgcaacgag  cgcaaccctt  actgttagtt  gccagcattc  agatgggcac  1080
tctagcgaga  ctgccggtga  caaaccgagg  aaggcgggg   acgacgtcag  atcatcatgc  1140
cccttatgac  ctgggctaca  cacgtgctac  aatggcgtat  acaacgagtt  gccaacccgc  1200
gagggtgagc  taatctctta  aagtacgtct  cagttcggat  tgtcgtctgc  aactcgacta  1260
catgaagttg  gaatcgctag  taatcgcgga  tcagcacgc   gcggtgaata  cgttcccggg  1320
tcttgtacac  accgcccgtc  acaccatggg  agtttgaatg  cccaaagccg  g           1371

SEQ ID NO: 2            moltype = DNA   length = 1373
FEATURE                 Location/Qualifiers
source                  1..1373
                        mol_type = genomic DNA
                        organism = Leuconostoc mesenteroides
SEQUENCE: 2
gaaaggtgct  tgcacctttc  aagtgagtgg  cgaacgggtg  agtaacacgt  ggacaacctg  60
cctcaaggct  ggggataaca  tttggaaaca  gatgctaata  ccgaataaaa  cttagtgtcg  120
catgacacaa  agttaaaagg  cgcttcggcg  tcacctagag  atggatccgc  ggtgcattag  180
ttagttggtg  gggtaaaggc  ctaccaagac  aatgatgcat  agccgagttg  agagactgat  240
cggccacatt  gggactgaga  cacggcccaa  actcctacgg  gaggctgcag  tagggaatct  300
tccacaatgg  gcgaaagcct  gatggagcaa  cgccgcgtgt  gtgatgaagg  ctttcgggtc  360
gtaaagcact  gttgtatggg  aagaacagct  agaataggaa  atgattttag  tttgacggta  420
ccataccaga  aagggacggc  taaatacgtg  ccagcagccg  cggtaatacg  tatgtcccga  480
gcgttatccg  gatttattgg  gcgtaaagcg  agcgcagacg  gtttattaag  tctgatgtga  540
aagcccggag  ctcaactccg  gaatggcatt  ggaaactggt  taacttgagt  gcagtagagg  600
taagtggaac  tccatgtgta  gcggtggaat  gcgtagatat  atggaagaac  accagtggcg  660
aaggcggctt  actggactgc  aactgacgtt  gaggctcgaa  agtgtgggta  gcaaacagga  720
ttagatacccc tggtagtcca  caccgtaaac  gatgaacact  aggtgttagg  aggtttccgc  780
ctcttagtgc  cgaagctaac  gcattaagtg  ttccgcctgg  ggagtacgac  cgcaaggttg  840
aaaactcaaag  gaattgacgg  ggacccgcac  aagcggtgga  gcatgtggtt  taattcgaag  900
caacgcgaag  aaccttacca  ggtcttgaca  tccttttgaag  cttttagaga  tagaagtgtt  960
ctcttcggag  acaaagtgac  aggtggtgca  tggtcgtcgt  cagctcgtgt  cgtgagatgt  1020
tgggttaagt  cccgcaacga  gcgcaaccct  tattgttagt  tgccagcatt  cagatgggca  1080
ctctagcgag  actgccggtg  acaaaccgga  ggaaggcggg  gacgacgtca  gatcatcatg  1140
cccccttatga  cctgggctac  acacgtgcta  caatggcgta  tacaacgagt  tgccaacccg  1200
cgagggtgag  ctaatctctt  aaagtacgtc  tcagttcgga  ttgtagtcgt  caactcgact  1260
acatgaagtc  ggaatcgcta  gtaatcgcgg  atcagcacgc  cgcggtgaat  acgttcccgg  1320
gtcttgtaca  caccgcccgt  cacaccatgg  gagtttgtaa  tgcccaaagc  cgg         1373

SEQ ID NO: 3            moltype = DNA   length = 722
FEATURE                 Location/Qualifiers
source                  1..722
                        mol_type = genomic DNA
                        organism = Saccharomyces cerevisiae
SEQUENCE: 3
ttttttttgtt  ttggcaagag  catgagagct  tttactgggc  aagaagacaa  gagatggaga  60
gtccagccgg  gcctgcgctt  aagtgcgcgg  tcttgctagg  cttgtaagtt  tctttcttgc  120
tattccaaac  ggtgagagat  ttttgtgctt  ttgttatagg  acaattaaaa  ccgtttcaat  180
acaacacact  gtggagtttt  catatctttg  caacttttc   tttgggcatt  cgagcaatcg  240
gggcccagag  gttaacaaac  ccaaacaatt  ttatttattc  attaaatttt  tgtcaaaaac  300
aagaatttt   gtaactggaa  attttaaaat  attaaaaact  ttcaacaacg  gatttttgg   360
ttttcgcatc  gatgaagaac  gcagcgaaat  gcaaaacgta  atgtgaattg  cagaattccg  420
ggaatcatcg  aatttttgaa  cgcccattgc  gcccccttgg  tattccgggg  gcatgcctgt  480
ttgagggtca  tttcctttc   aaacattttg  tttggtaggg  agggatactc  tttgagtta   540
acttgaaatt  gctggccttt  tcattggatg  tttttttttt  ccaaagagag  gtttctctgc  600
gtgcttgagg  tataatgcaa  gtacggtcgt  tttaggtttt  accaactgcg  gctaatcttt  660
tttatactga  gcgtattgga  acgttatcga  taagaagaga  gcgtctaggc  gaacaatgtt  720
ct                                                                     722

SEQ ID NO: 4            moltype = DNA   length = 718
FEATURE                 Location/Qualifiers
source                  1..718
                        mol_type = genomic DNA
                        organism = Saccharomyces cerevisiae
SEQUENCE: 4
ttttttttgtt  ttggcaagag  catgagagct  tttactgggc  aagaagacaa  gagatggaga  60
gtccagccgg  gcctgcgctt  aagtgcgcgg  tcttgctagg  cttgtaagtt  tctttcttgc  120
tattccaaac  ggtgagagat  ttctgtgctt  ttgttatagg  acaattaaaa  ccgtttcaat  180
acaacacact  gtggagtttt  catatctttg  caacttttc   tttgggcatt  cgagcaatcg  240
gggcccagag  gtaacaaaca  caaacaattt  tatctattca  ttaaattttt  gtcaaaaaca  300
agaatttctg  taactggaaa  ttttaaaatt  attaaaaact  tcaacaacgg  atctcttgg   360
ttctcgcatc  gatgaagaac  gcagcgaaat  gcgatacgta  atgtgaattg  cagaattccg  420
```

-continued

```
tgaatcatcg aatctttgaa cgcacattgc ccccttggta ttccaggggg catgcctgtt   480
tgagcgtcat ttccttctca aacattctgt ttggtagtga gtgatactct ttggagttaa   540
cttgaaattg ctggccfttt cattggatgt ttttttfcca aagagaggtt tctctgcgtg   600
cttgaggtat aatgcaagta cggtcgtttt aggttttacc aactgcggct aatctttttt   660
atactgagcg tattggaacg ttatcgataa gaagagagcg tctaggcaac aatgttct     718
```